US012767768B2

(12) United States Patent
Feng et al.

(10) Patent No.: US 12,767,768 B2
(45) Date of Patent: Oct. 20, 2026

(54) COMPOSITIONS AND METHODS OF MAKING MULTIFUNCTIONAL ORGANOGELS

(71) Applicant: Board of Supervisors of Louisiana State University and Agricultural and Mechanical College, Baton Rouge, LA (US)

(72) Inventors: Xiaming Feng, Baton Rouge, LA (US); Guoqiang Li, Baton Rouge, LA (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 0 days.

(21) Appl. No.: 18/918,217

(22) Filed: Oct. 17, 2024

(65) Prior Publication Data

US 2025/0129219 A1 Apr. 24, 2025

Related U.S. Application Data

(60) Provisional application No. 63/592,253, filed on Oct. 23, 2023.

(51) Int. Cl.

*C08J 3/11* (2006.01)
*C08J 3/28* (2006.01)
*C08K 3/04* (2006.01)
*C08K 5/12* (2006.01)

(52) U.S. Cl.

CPC . *C08J 3/11* (2013.01); *C08J 3/28* (2013.01); *C08K 3/041* (2017.05); *C08K 5/12* (2013.01); *C08J 2347/00* (2013.01); *C08K 2201/001* (2013.01); *C08K 2201/011* (2013.01)

(58) Field of Classification Search

CPC .......................................................... C08J 3/11
See application file for complete search history.

(56) References Cited

U.S. PATENT DOCUMENTS

| | | | | |
|---|---|---|---|---|
| 5,300,573 A * | 4/1994 | Patel | C08L 33/06 | 525/122 |
| 2010/0155998 A1* | 6/2010 | Rule | C08L 65/00 | 526/171 |
| 2010/0316845 A1* | 12/2010 | Rule | C09J 7/24 | 156/60 |
| 2016/0137778 A1* | 5/2016 | Anthamatten | C08J 3/28 | 522/149 |

* cited by examiner

*Primary Examiner* — William D Young
(74) *Attorney, Agent, or Firm* — Thomas | Horstemeyer, LLP

(57) ABSTRACT

In one aspect, the disclosure relates to two-way shape memory organogels including at least a crosslinked polymer and an organic free phase. In a further aspect, the un-crosslinked polymer or polymer precursor such as, for example, an oligomer, can be crosslinked by a photoinitiator through free-radical polymerization. In one aspect, the polymer can be cis-poly(1,4-butadiene), while the organic free phase can be a plasticizer such as, for example, bis(2-ethylhexyl) phthalate. The two-way shape memory organogels have excellent stability in high vacuum environments and at high temperatures, desirable mechanical properties, and reliable actuation reversibility. Also disclosed are methods of making the organogels and sensors and other devices that include the organogels.

19 Claims, 23 Drawing Sheets

COMPOSITIONS AND METHODS OF MAKING MULTIFUNCTIONAL ORGANOGELS

CROSS-REFERENCE TO RELATED APPLICATIONS

This application claims priority to, and the benefit of, U.S. provisional application Ser. No. 63/592,253 filed Oct. 23, 2023, which is hereby incorporated by reference in its entirety.

STATEMENT REGARDING FEDERALLY SPONSORED RESEARCH OR DEVELOPMENT

This invention was made with government support under grant numbers GR-00002850 and GR-00007711, both awarded by the National Science Foundation. The government has certain rights in the invention.

BACKGROUND

Shape memory polymers are smart materials that can be shaped into temporary forms and recover the permanent shapes by external trigger on demand. The thermally triggered shape memory effect is particularly useful and widely studied because it is easy to achieve and no additional structures are needed. As for the two-way shape memory effect, its primary actuation feature is thermally opposite to common physics. Namely, two-way shape memory polymers expand upon cooling and contract upon heating. The two-way shape memory effect was first observed in liquid crystalline elastomers in 2001. Then, Mather et al. reported the two-way shape memory effect in a crosslinked semi-crystalline polymer network—poly(cyclooctene). After that, various two-way shape memory polymer systems with varying actuation strains and working temperature ranges were developed.

Polymer gels are soft and stretchable and are composed of polymer networks swollen with small molecules, such as water for hydrogels, ionic liquid for ionogels, and organic solvent for organogels. Compared to hydrogels and ionogels, organogels are more stable to thermal and moisture change due to the stability of organic solvents, which are more feasible in a wide variety of applications. Generally, organogels can be prepared by swelling crosslinked polymers in organic solvents. However, the obtained organogels are sometimes inhomogeneous because of a concentration gradient associated with depth.

Stimuli-responsive gels have attracted attention due to their unique properties and smart features. Tremendous efforts have been devoted to the development of various functional gels, such as hydrogels for drug release and ionogels for strain sensing. Indeed, some shape memory polymer gels have been reported recently. For example, Zhao et al. developed a highly stretchable, shape memory organohydrogel by utilizing phase-transition micro inclusions. Cai and coworkers demonstrated a high strength, recyclable, anti-swelling and shape-memory hydrogels based on crystal microphase crosslinking for flexible sensor applications. However, the two-way shape memory properties of polymer gels remain unexplored.

Previously, a thermally crosslinked poly(1,4-butadiene) material has been synthesized with reversible elongation upon cooling and contraction upon heating at temperatures below 0° C. Both entropy and enthalpy mechanisms were responsible for the reversible actuation of this system. However, the actuation strain was still not high enough for many common applications. Furthermore, the actuation reversibility of this polymer system was only 75%, which is quite low for long-term usage in practical applications.

Despite advances in shape-memory polymer and organogel research, there is still a scarcity of organogels having two-way shape-memory properties that are homogeneous, that exhibit a high actuation strain as well as actuation reversibility. Ideally, the organogels would be homogeneous and would not exhibit concentration gradients of their components associated with depth in the organogel structure. An ideal organogel could be easily and quickly crosslinked without requiring a large energy input. In one embodiment, the organogel and crosslinking rate could be modified to allow 3D printing of the organogel. In some embodiments, such an organogel would be recyclable. These needs and other needs are satisfied by the present disclosure.

SUMMARY

In accordance with the purpose(s) of the present disclosure, as embodied and broadly described herein, the disclosure, in one aspect, relates to two-way shape memory organogels including at least a crosslinked polymer and an organic free phase. In a further aspect, the un-crosslinked polymer or polymer precursor such as, for example, an oligomer, can be crosslinked by a photoinitiator through free-radical polymerization. In one aspect, the polymer can be cis-poly(1,4-butadiene), while the organic free phase can be a plasticizer such as, for example, bis(2-ethylhexyl) phthalate. The two-way shape memory organogels have excellent stability in high vacuum environments and at high temperatures, desirable mechanical properties, and reliable actuation reversibility. Also disclosed are methods of making the organogels and sensors and other devices that include the organogels.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

(FIG. 1D) Storage modulus, (FIG. 1E) loss modulus, and (FIG. 1F) complex viscosity versus angular frequency for cross-linked PBD based organogels.

Figure 1A:
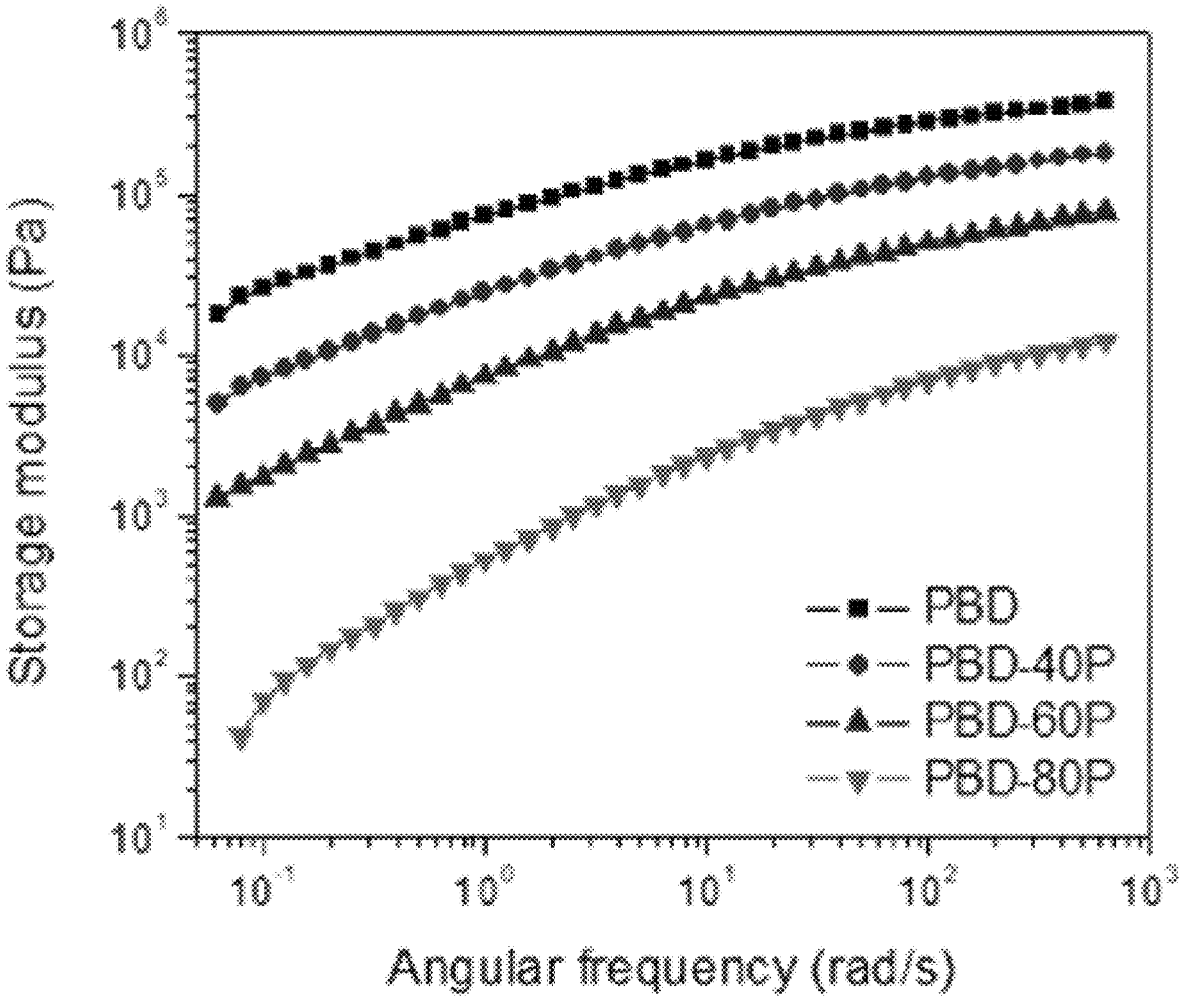
FIGS. 1A-1F show (FIG. 1A) storage modulus, (FIG. 1B) loss modulus, and (FIG. 1C) complex viscosity versus angular frequency for un-crosslinked pure PBD and un-crosslinked PBD with various amounts of plasticizer.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

Disclosed herein is the use of a common plasticizer as a free organic phase to develop polybutadiene (PBD)-based organogels. In one aspect, owing to the incorporation of a photo-initiator, the organogels can be crosslinked by UV light in several minutes. In another aspect, the organogels are ultrastable to high vacuum environments and high temperature. In a further aspect, and without wishing to be bound by theory, the PBD-based organogels exhibit a high two-way shape memory actuation strain due to the balanced melting/crystallization behavior and crosslinked molecular networks. In one aspect, the PBD-based organogels can be used in strain sensing applications.

In one aspect, in situ polymerization of monomer/oligomer in organic solvents is an effective method to fabricate homogeneous organogels such as those presently disclosed. In another aspect, among known polymerization methods, photo-induced polymerization and/or crosslinking is feasible in practical usage, is energy-saving, and can be achieved in minutes instead of hours or days. In a further aspect, photo-induced crosslinking can be easily modified for 3D printing.

Two-Way Shape Memory Organogels

In one aspect, provided herein are two-way shape memory organogels including at least a crosslinked polymer, a photoinitiator, and an organic free phase. In an aspect, the polymer can be cis-poly(1,4-butadiene) (PBD). In an aspect, the PBD can have a molecular weight of from about 5000 to about 500,000 Da, or from about 10,000 Da to about 500,000 Da, or of about 5000; 10,000; 25,000; 50,000; 75,000; 100,000; 150,000; 200,000; 250,000; 300,000; 350,000; 400,000; 450,000; or about 500,000 Da, or a combination of any of the foregoing values, or a range encompassing any of the foregoing values. In a further aspect, the polymer can be present at from about 10 wt % to about 100 wt %, or from about 20 wt % to about 60 wt %, or about 10, 20, 30, 40, 50, 60, 70, 80, 90, or about 100 wt %, or at about 37 wt % of the organogel. In some aspects, the polymer has a glass transition temperature ($T_g$) of from about −60° C. to about −110° C., or from about 100° C. to about −110° C., or of about −60, −65, −70, −75, −80, −85, −90, −95, −100, −105, or −110° C., or a combination of any of the foregoing values, or a range encompassing any of the foregoing values. In another aspect, the polymer has a viscosity (Mooney ML 1+4 at 100° C.) of from about 10 to about 100, from about 40 to about 50, or of about 10, 20, 30, 40, 50, 60, 70, 80, 90, or about 100, or a combination of any of the foregoing values, or a range encompassing any of the foregoing values.

In an aspect, the photoinitiator can be 2-hydroxy-2-methylpropiophenone, phenylbis(2,4,6-trimethylbenzoyl) phosphine oxide, 2,2-dimethoxy-2-phenylacetophenone, 2,2-bimethoxy-2-phenylacetophenone, 1-Hydroxycyclohexyl phenyl ketone, diphenyl(2,4,6-trimethylbenzoyl) phosphine oxide, 2,4-diethyl-9H-thioxanthen-9-one, a triarylsulfonium hexafluorophosphate salt, lithium phenyl-2,4,6-trimethylbenzoylphosphinate, a triarylsulfonium hexafluoroantimonate salt, 2-hydroxy-4'-(2-hydroxyethoxy)-2-methylpropiophenone, ethyl(2,4,6-trimethylbenzoyl) phenylphosphinate, 2-methyl-4'-(methylthio)-2-morpholinopropiophenone, 2-isopropylthioxanthone, benzophenone, 4-chlorobenzophenone, 4-benzoylbiphenyl, 2-benzyl-2-(dimethylamino)-4'-morpholino-butyrophenone, or any combination thereof. In one aspect, the photoinitiator is 2-hydroxy-2-methylpropiophenone. In some aspects, the photoinitiator is present at from about 0.5 wt % to about 5 wt %, or at about 0.5, 1, 1.5, 2, 2.5, 3, 3.5, 4, 4.5, or about 5 wt %, or is about 3 wt % of the organogel.

In some aspects, the organic free phase includes a plasticizer such as, for example, bis(2-ethylhexyl) phthalate, dioctyl phthalate, dibutyl phthalate, diisobutyl phthalate, tritolyl phosphate, trioctyl phosphate, butyl oleate, tributyl citrate, epoxidized soybean oil, dibutyl sebacate, dioctyl sebacate, bis(2-ethylhexyl) adipate, dioctyl adipate, tributyl O-acetylcitrate, Tri(ethylene glycol) bis(2-ethylhexanoate), butyl oleate, epoxidized linseed oil, butyl epoxy stearate, or any combination thereof. In one aspect, the plasticizer is bis(2-ethylhexyl) phthalate. In one aspect, the organic free phase is present at from about 40 wt % to about 80 wt % in the two-way shape memory organogel, or at about 40, 45, 50, 55, 60, 65, 70, 755, or about 80 wt %, or a combination of any of the foregoing values, or a range encompassing any of the foregoing values. In one aspect, the organic free phase is present at 60 wt %.

Properties of the Two-Way Shape Memory Organogels

In one aspect, the disclosed two-way shape memory organogels are stable in high vacuum. Further in this aspect, the two-way shape memory organogels can lose less than 5%, less than 4%, less than 3%, or less than 2% total weight after 48 hours in a high vacuum environment. In another aspect, the disclosed two-way shape memory organogels are stable at high temperatures. Further in this aspect, the two-way shape memory organogels lose less than about 5%, less than 4%, less than 3%, or less than 2% weight after 2 hours at 100° C.

In another aspect, the two-way shape memory organogels have a reversible elongation upon cooling (EUC) of from about 50% to about 200%, or of about 50, 60, 70, 80, 90, 100, 110, 120, 130, 140, 150, 160, 170, 180, 190, or about 200%, or of about 156% and a reversible contraction upon heating (CUH) of from about 50% to about 200%, or of about 50, 60, 70, 80, 90, 100, 110, 120, 130, 140, 150, 160, 170, 180, 190, or about 200%, or of about 151%. In another aspect, actuation reversibility of the two-way shape memory organogels is greater than about 50%, 55%, 60%, 65%, 70%, 75%, 80%, 85%, 90%, 95%, or is at least 97%.

In one aspect, the two-way shape memory organogels have a storage modulus of from about 0.01 MPa to about 1,000 MPa, or of about 0.01, 0.1, 1, 10, 50, 100, 150, 200, 250, 300, 350, 400, 450, 500, 550, 600, 650, 700, 750, 800, 850, 900, 950, or about 1,000 MPa, or a combination of any of the foregoing values, or a range encompassing any of the foregoing values. In an aspect, storage modulus can depend on temperature and frequency. In another aspect, the two-way shape memory organogels have a loss modulus of from about 0.001 MPa to about 1,000 MPa, or of about 0.001, 0.01, 0.1, 1, 10, 50, 100, 150, 200, 250, 300, 350, 400, 450, 500, 550, 600, 650, 700, 750, 800, 850, 900, 950, or about 1,000 MPa, or a combination of any of the foregoing values, or a range encompassing any of the foregoing values. In an aspect, loss modulus can depend on temperature and frequency. In still another aspect, the two-way shape memory organogels have a complex viscosity of from about 10 Pas to about 1,000,000 Pa·s, or about 10; 100; 1000; 10,000; 100,000; 250,000; 500,000; 750,000; or about 1,000,000 Pa·s, or a combination of any of the foregoing values, or a range encompassing any of the foregoing values. In one aspect, the complex viscosity can be dependent on temperature and frequency. In still another aspect, the two-way shape memory organogels have a melting point of form about 0° C. to about −40° C., or of from about −10° C. to about −25° C., or of about 0, −5, −10, −15, −20, −25 −30, −35, or about −40° C., or a combination of any of the foregoing values, or a range encompassing any of the foregoing values.

In one aspect, the two-way shape memory organogels can complete three or more actuation cycles without degradation. In still another aspect, creep strain of the two-way shape memory organogels is from about 5% to about 25% after three actuation cycles, or is about 5, 10, 15, 20, or about 25% after three actuation cycles. In still another aspect, the two-way shape memory organogels have an elongation at break of from about 100% to about 2000%, or of from about 400% to about 1000%, or of about 100, 250, 500, 750, 1000, 1250, 1500, 1750, or about 2000%, or a combination of any of the foregoing values, or a range encompassing any of the foregoing values.

Method of Making the Organogels

In one aspect, provided herein is a method for making the disclosed two-way shape memory organogels, the method including at least the steps of:

(a) contacting the polymer with an organic solvent to produce a swollen polymer;
(b) admixing the swollen polymer with the plasticizer and the photo-initiator;
(c) evaporating the solvent to form an uncrosslinked organogel; and
(d) curing the uncrosslinked organogel to form the two-way shape memory organogel.

In a further aspect, the organic solvent can be chloroform. In another aspect, step (a) is conducted for at least 3 days. In still another aspect, curing is accomplished using UV irradiation. In one aspect, the method further includes 3D printing the uncrosslinked organogel into a three-dimensional shape prior to performing step (d).

Devices Including the Organogels

Also disclosed herein are devices including the disclosed two-way shape memory organogels. In one aspect, the devices can be sensors such as, for example, strain sensors or temperature sensors. In a further aspect, when the device is a strain sensor, the device further includes conductive particles such as, for example, metallic particles, carbon black, multiwalled carbon nanotubes (MWCNTs), graphene flakes, graphite flakes, MXene nanosheets, silver nanowires, or any combination thereof, embedded in a surface of the two-way shape memory organogel. In another aspect, the device can be an actuator. In one aspect, when the device is an actuator, it can be useful in wearable electronics, soft robotics, and structural health monitoring, among other applications.

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

Definitions

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of.

As used in the specification and the appended claims, the singular forms "a," "an" and "the" include plural referents unless the context clearly dictates otherwise. Thus, for example, reference to "a polymer," "a photoinitiator," or "an organogel," include, but are not limited to, mixtures or combinations of two or more such polymers, photoinitiators, or organogels, and the like.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the term "effective amount" refers to an amount that is sufficient to achieve the desired modification of a physical property of the composition or material. For example, an "effective amount" of a free organic phase refers to an amount that is sufficient to achieve the desired improvement in the property modulated by the formulation component, e.g. achieving the desired two-way shape memory properties of the disclosed organogels. The specific level in terms of wt % in a composition required as an effective amount will depend upon a variety of factors including the amount and type of photoinitiator, amount and type of polymer, degree of crosslinking, and end use conditions (e.g., temperature, pressure, etc.) of the two-way shape memory organogel including the free organic phase.

As used herein, the terms "optional" or "optionally" means that the subsequently described event or circumstance can or cannot occur, and that the description includes instances where said event or circumstance occurs and instances where it does not.

A "shape memory polymer" as used herein is a smart material that can modify one or more properties (e.g. size, shape, stiffness, strain, stress, or the like) in response to an external stimulus (e.g. heat, light, pH, ion concentration, electric field, magnetic field, presence of a solvent, or the like). Shape memory polymers can return from these deformed states to their original state.

A "two-way shape memory polymer" as used herein is a smart material that can reversibly and repeatedly shift between its permanent shape and programmed temporary shape under external stimuli such as cycling temperatures. Depending on the training or programming, a two-way shape memory polymer can exhibit reversible actuation under external tension, under zero external load, or even under external compression.

As used herein, an "organogel" is a gel having an organic liquid phase within a three-dimensional, crosslinked network.

Unless otherwise specified, temperatures referred to herein are based on atmospheric pressure (i.e. one atmosphere).

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

Aspects

The present disclosure can be described in accordance with the following numbered aspects, which should not be confused with the claims.

Aspect 1. A two-way shape memory organogel comprising a crosslinked polymer, a photoinitiator, and an organic free phase.

Aspect 2. The two-way shape memory organogel of aspect 1, wherein the polymer comprises cis-poly(1,4-butadiene) (PBD) having a molecular weight of from about 5000 Da to about 500,000 Da Aspect 3. The two-way shape memory organogel of aspect 1 or 2, wherein the polymer is present at from about 10 wt % to about 100 wt % of the organogel.

Aspect 4. The two-way shape memory organogel of any one of aspects 1-3, wherein the polymer has a glass transition temperature ($T_g$) of from about −60° C. to about −110° C.

Aspect 5. The two-way shape memory organogel of any one of aspects 1-4, wherein the polymer has a viscosity of from about 10 to about 100 (Mooney ML 1+4 at 100° C.).

Aspect 6. The two-way shape memory organogel of any one of aspects 1-5, wherein the photoinitiator comprises 2-hydroxy-2-methylpropiophenone, phenylbis(2,4,6-trimethylbenzoyl)phosphine oxide, 2,2-dimethoxy-2-phenylacetophenone, 2,2-bimethoxy-2-phenylacetophenone, 1-Hydroxycyclohexyl phenyl ketone, diphenyl(2,4,6-trimethylbenzoyl)phosphine oxide, 2,4-diethyl-9H-thioxanthen-9-one, a triarylsulfonium hexafluorophosphate salt, lithium phenyl-2,4,6-trimethylbenzoylphosphinate, a triarylsulfonium hexafluoroantimonate salt, 2-hydroxy-4'-(2-hydroxyethoxy)-2-methylpropiophenone, ethyl (2,4,6-trimethylbenzoyl) phenylphosphinate, 2-methyl-4'-(methylthio)-2-morpholinopropiophenone, 2-isopropylthioxanthone, benzophenone, 4-chlorobenzophenone, 4-benzoylbiphenyl, 2-benzyl-2-(dimethylamino)-4'-morpholino-butyrophenone, or any combination thereof.

Aspect 7. The two-way shape memory organogel of any one of aspects 1-6, wherein the photoinitiator is present at from about 0.5 wt % to about 5 wt % of the organogel.

Aspect 8. The two-way shape memory organogel of any one of aspects 1-7, wherein the organic free phase comprises a plasticizer.

Aspect 9. The two-way shape memory organogel of aspect 8, wherein the plasticizer comprises bis(2-ethylhexyl) phthalate, dioctyl Phthalate, dibutyl phthalate, diisobutyl phthalate, tritolyl phosphate, trioctyl phosphate, butyl oleate, tributyl citrate, epoxidized soybean oil, dibutyl sebacate, dioctyl sebacate, bis(2-ethylhexyl) adipate, dioctyl adipate, tributyl O-acetylcitrate, Tri(ethylene glycol) bis(2-ethylhexanoate), butyl oleate, epoxidized linseed oil, butyl epoxy stearate, or any combination thereof.

Aspect 10. The two-way shape memory organogel of any one of aspects 1-9, wherein the organic free phase is present at from about 40 wt % to about 80 wt % in the two-way shape memory organogel.

Aspect 11. The two-way shape memory organogel of aspect 10, wherein the organic free phase is present at about 60 wt % in the two-way shape memory organogel.

Aspect 12. The two-way shape memory organogel of any one of aspects 1-11, wherein the two-way shape memory organogel loses less than 5% total weight after 48 h in a high vacuum environment.

Aspect 13. The two-way shape memory organogel of any one of aspects 1-12, wherein the two-way shape memory organogel loses less than about 5% total weight after 2 h at 100° C.

Aspect 14. The two-way shape memory organogel of any one of aspects 1-13, wherein the two-way shape memory organogel has a reversible elongation upon cooling (EUC) of from about 50% to about 200%.

Aspect 15. The two-way shape memory organogel of any one of aspects 1-14, wherein the two-way shape memory organogel has a reversible contraction upon heating (CUH) of from about 50% to about 200%.

Aspect 16. The two-way shape memory organogel of any one of aspects 1-15, wherein actuation reversibility is greater than 50%.

Aspect 17. The two-way shape memory organogel of aspect 16, wherein the two-way shape memory organogel has an actuation reversibility of about 97%.

Aspect 18. The two-way shape memory organogel of any one of aspects 1-17, wherein the two-way shape memory organogel has a storage modulus of from about 0.01 MPa to about 1,000 MPa.

Aspect 19. The two-way shape memory organogel of any one of aspects 1-18, wherein the two-way shape memory organogel has a loss modulus of from about 0.001 MPa to about 1,000 MPa.

Aspect 20. The two-way shape memory organogel of any one of aspects 1-19, wherein the two-way shape memory organogel has a complex viscosity of from about 10 Pa·s to about 1,000,000 Pa·s.

Aspect 21. The two-way shape memory organogel of any one of aspects 1-20, wherein the two-way shape memory organogel has a melting point of from about 0° C. to about −40° C.

Aspect 22. The two-way shape memory organogel of any one of aspects 1-21, wherein the two-way shape memory organogel can complete three or more actuation cycles without degradation.

Aspect 23. The two-way shape memory organogel of any one of aspects 1-22, wherein creep strain of the two-way shape memory organogel is from about 5% to about 25% after three actuation cycles.

Aspect 24. The two-way shape memory organogel of any one of aspects 1-23, wherein creep strain of the two-way shape memory organogel is about 9% after three actuation cycles.

Aspect 25. The two-way shape memory organogel of any one of aspects 1-24, wherein the two-way shape memory organogel has an elongation at break of from about 100% to about 2000%.

Aspect 26. A method for making the two-way shape memory organogel of any one of aspects 1-25, the method comprising:

(a) contacting the polymer with an organic solvent to produce a swollen polymer;

(b) admixing the swollen polymer with the plasticizer and the photo-initiator;

(c) evaporating the solvent to form an uncrosslinked organogel; and (d) curing the uncrosslinked organogel to form the two-way shape memory organogel.

Aspect 27. The method of aspect 26, wherein the organic solvent comprises chloroform.

Aspect 28. The method of aspect 26 or 27, wherein step (a) is conducted for at least 3 days.

Aspect 29. The method of any one of aspects 26-29, wherein curing is accomplished using UV irradiation.

Aspect 30. The method of any one of aspects 26-29, further comprising 3D printing the uncrosslinked organogel into a three-dimensional shape prior to performing step (d).

Aspect 31. A device comprising the two-way shape memory organogel of any one of aspects 1-25.

Aspect 32. The device of aspect 31, wherein the device comprises a sensor or an actuator.

Aspect 33. The device of aspect 32, wherein the sensor comprises a strain sensor or a temperature sensor.

Aspect 34. The device of aspect 33, wherein the strain sensor further comprises conductive particles selected from metallic particles, carbon black, multiwalled carbon nanotubes (MWCNTs), graphene flakes, graphite flakes, MXene nanosheets, silver nanowires, or any combination thereof embedded in a surface of the two-way shape memory organogel.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1: Experimental

Materials

Cis-poly(1,4-butadiene) (PBD) (Budene® 1208) was supplied by Goodyear Chemical (Akron, OH, USA). The viscosity is 46 (Mooney ML 1+4 @ 100° C.) and the onset glass transition temperature is −104° C. Chloroform, bis(2-ethylhexyl) phthalate, and 2-hydroxy-2-methylpropiophenone (97%) were purchased from Sigma-Aldrich and used as received.

Synthesis of PBD Based Organogels

First, 50 g of PBD were cut into small pieces and immersed into 950 g of chloroform for at least 3 days. The conical flask was fully sealed to avoid the evaporation of chloroform. After completely swelling, the mixture was vigorously stirred for 1 h to obtain a sticky homogeneous solution. Various amounts of plasticizer bis(2-ethylhexyl) phthalate and photoinitiator 2-hydroxy-2-methylpropiophenone were added into the solution upon further stirring. Chloroform was then removed by simple evaporation and overnight vacuum drying at room temperature. Three formulas with different amounts (40, 60, and 80 wt %) of plasticizer were prepared. The content of photoinitiator is constant (3 wt % of PBD) for all formulas. After completely removing the solvent, the obtained samples were named as PBD-40P, PBD-60P, and PBD-80P corresponding to the content of the plasticizer. As for UV curing, the obtained sticky samples were smeared into a plastic spacer with thickness of 1.2 mm clamped by two transparent plastic slides. The samples were maintained until the air bubbles disappeared. The samples were then cured in a UV chamber (IntelliRay 600, Uvitron International, USA) for 60 s under 80% irradiation intensity (232 nm, 45 mW/cm$^2$). The crosslinked samples were abbreviated as c-PBD-40P, c-PBD-60P, and c-PBD-80P, respectively.

For demonstrating the strain sensing application, the organogel specimen was coated with multiwalled carbon nanotubes (20-40 nm of diameter, 5-15 μm of length) to increase the electrical conductivity. Specifically, the multiwalled carbon nanotube particles were homogeneously sprayed on the surface of the PBD-60P film. The obtained sample was wrapped by PTFE films and hot-pressed at 100° C. for 2 h. Finally, the sensor specimen was treated by ultrasonic cleaning in ethanol to remove the unbound carbon nanotubes.

Characterization

Thermal behavior of the organogels was characterized by PerkinElmer 4000 differential scanning calorimeter (DSC) (MA, USA). About 5 mg of the samples was heated and cooled between −70 and 80° C. at a rate of 10° C. min$^{-1}$; both the holding times at −70 and 80° C. were 2 min. The second heating-cooling cycle was conducted and profiled to remove the effect of thermal history. The purging rate of nitrogen gas was 30 mL $min^{-1}$.

Storage modulus, loss modulus, and tan δ curves were collected by a Q800 dynamic mechanical analyzer (DMA) (TA Instruments, DE, United States) in multifrequency strain mode with a heating rate of 3° C./min and a frequency of 1 Hz. The temperature range was from −90° C. to 60° C.

Thermogravimetric analysis (TGA) was conducted by a Q5000 thermal analyzer (TA Co., USA). For non-isothermal test, the sample was heated from 25 to 800° C. at a heating rate of 10° C./min in nitrogen atmosphere. For isothermal test, the sample was rapidly heated from 25 to 100° C. at a heating rate of 100° C./min in nitrogen atmosphere, then isothermal at 100° C. for 120 min. The purging rate of nitrogen gas was 40 mL $min^{-1}$.

Tensile test of dumbbell-shaped samples (ASTM D412) was performed by an expert 2610 MTS (ADMET, Norwood, MA, United States). The stretching rate was 20, 100, and 500 mm/min, respectively. For loading-unloading cycle test, the stretching rate was 20 mm/min. At least three parallel samples were used for tensile test.

Two-way shape memory performance was acquired with control-force mode using the Q800 dynamic mechanical analyzer (DMA) (TA Instruments, DE, USA). The tensile load and temperature were preprogrammed, and the strain change can be precisely recorded. The heating and cooling rate was 5° C. $min^{-1}$. The isothermal time at −40° C. and 60° C. was 5 min and 3 min, respectively.

The stability of organogels was tested by drying in a vacuum oven at room temperature for various periods. The weight change was recorded by a balance.

The rheological behaviors of uncrosslinked specimens and crosslinked organogels were characterized with an HR 30 Discovery Hybrid Rheometer (TA Instruments, DE, USA) in parallel plate geometry (25 mm diameter and 1000 μm gap). Frequency sweep measurements were performed at 25° C. from 0.01 Hz to 100 Hz in dynamic mode with a strain of 1%. Stain sweep tests were performed at 25° C. from 0.01% to 100% in dynamic mode with an angular frequency of 10 rad/s.

The strain sensing properties were tested by coupling DMA (TA Instruments, DE, USA) and SourceMeter 2400 (Fotronic Co., MA). The specimen was stretched by DMA in strain rate mode at a rate of 5.0%/min to 20% and 50%, respectively. The change of electrical resistance was recorded in I-V mode by the SourceMeter 2400.

Example 2: Results and Discussion

Viscoelastic Behaviors

Figure 1B:
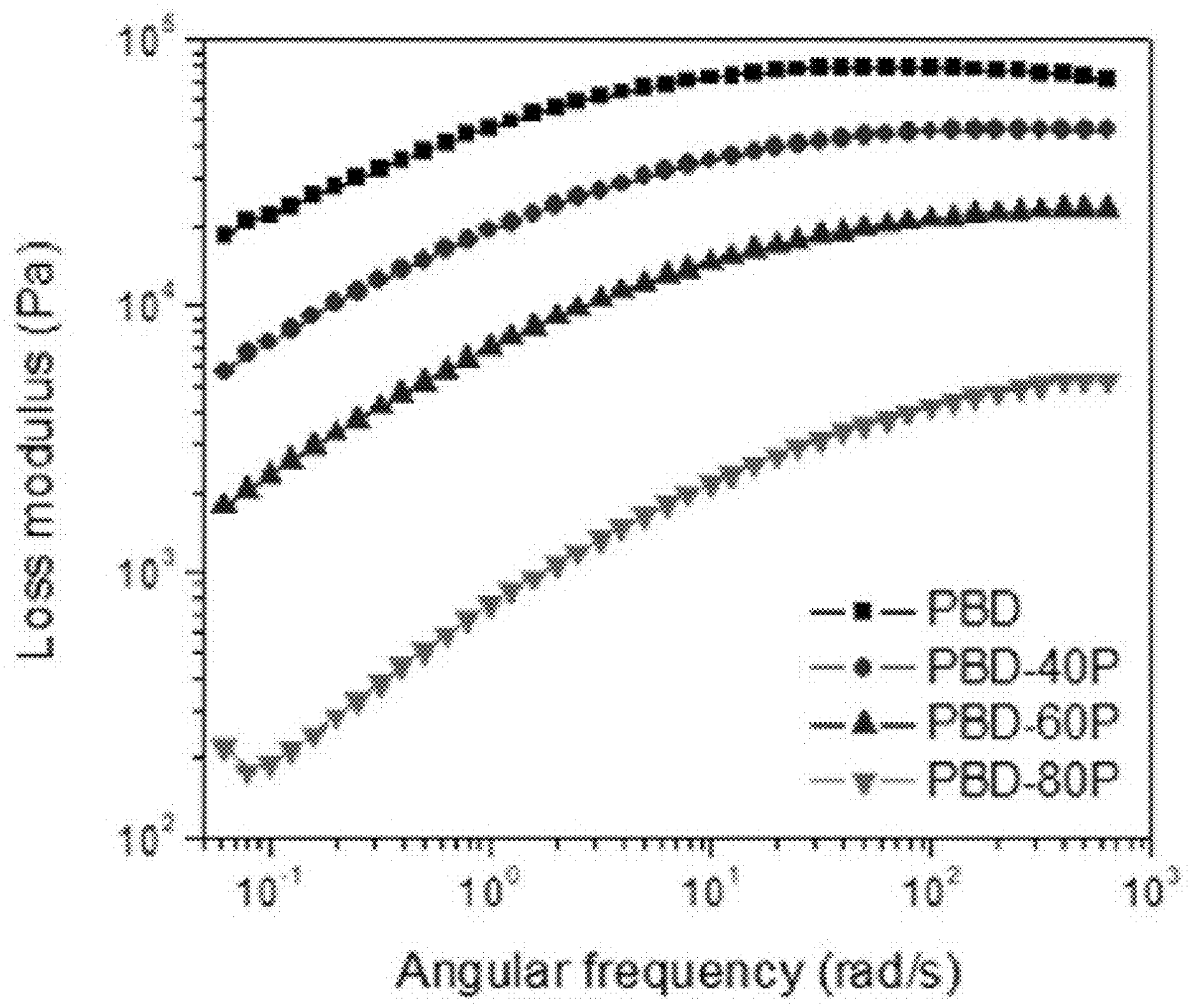
Figure 1C:
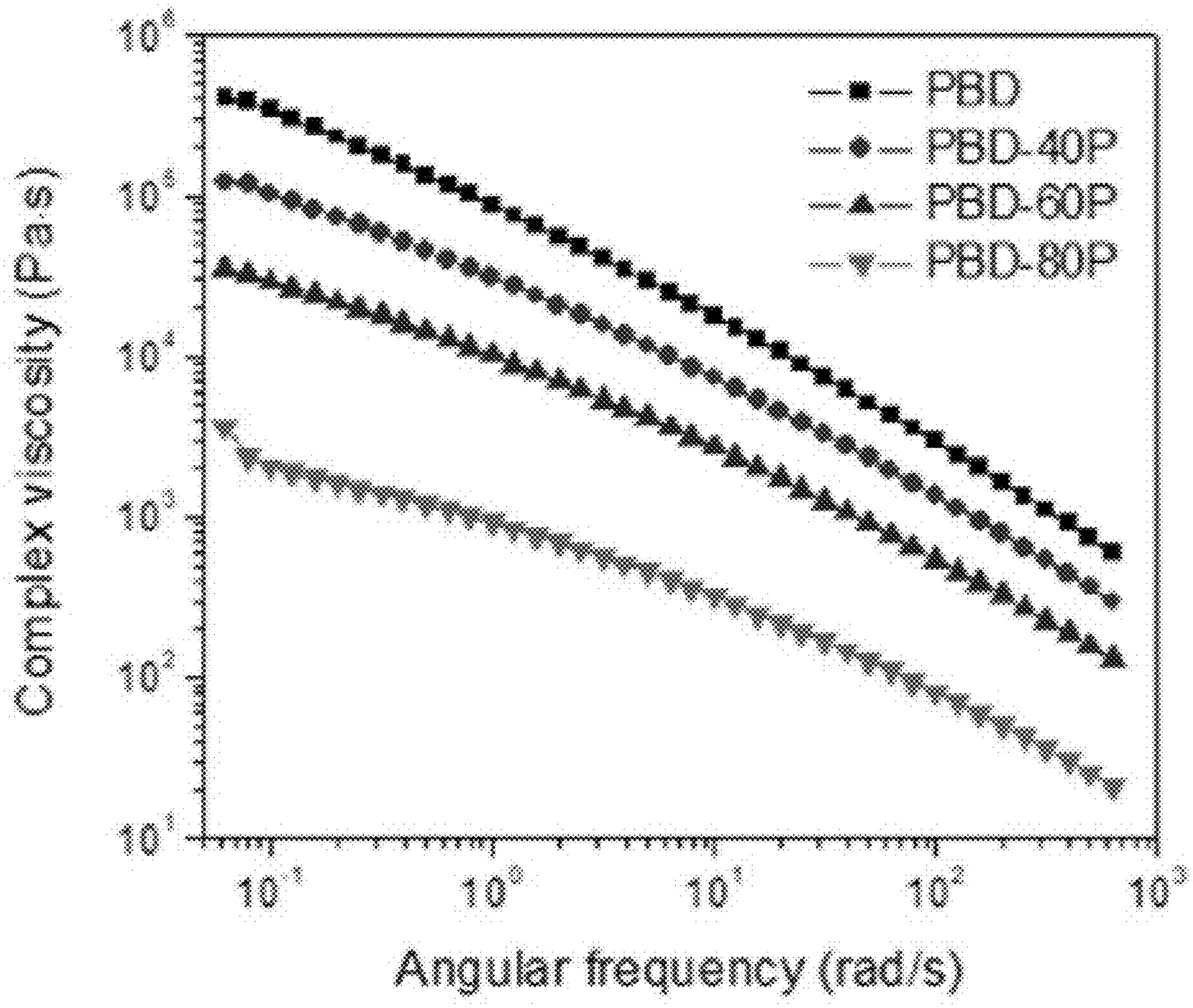
Figure 1D:
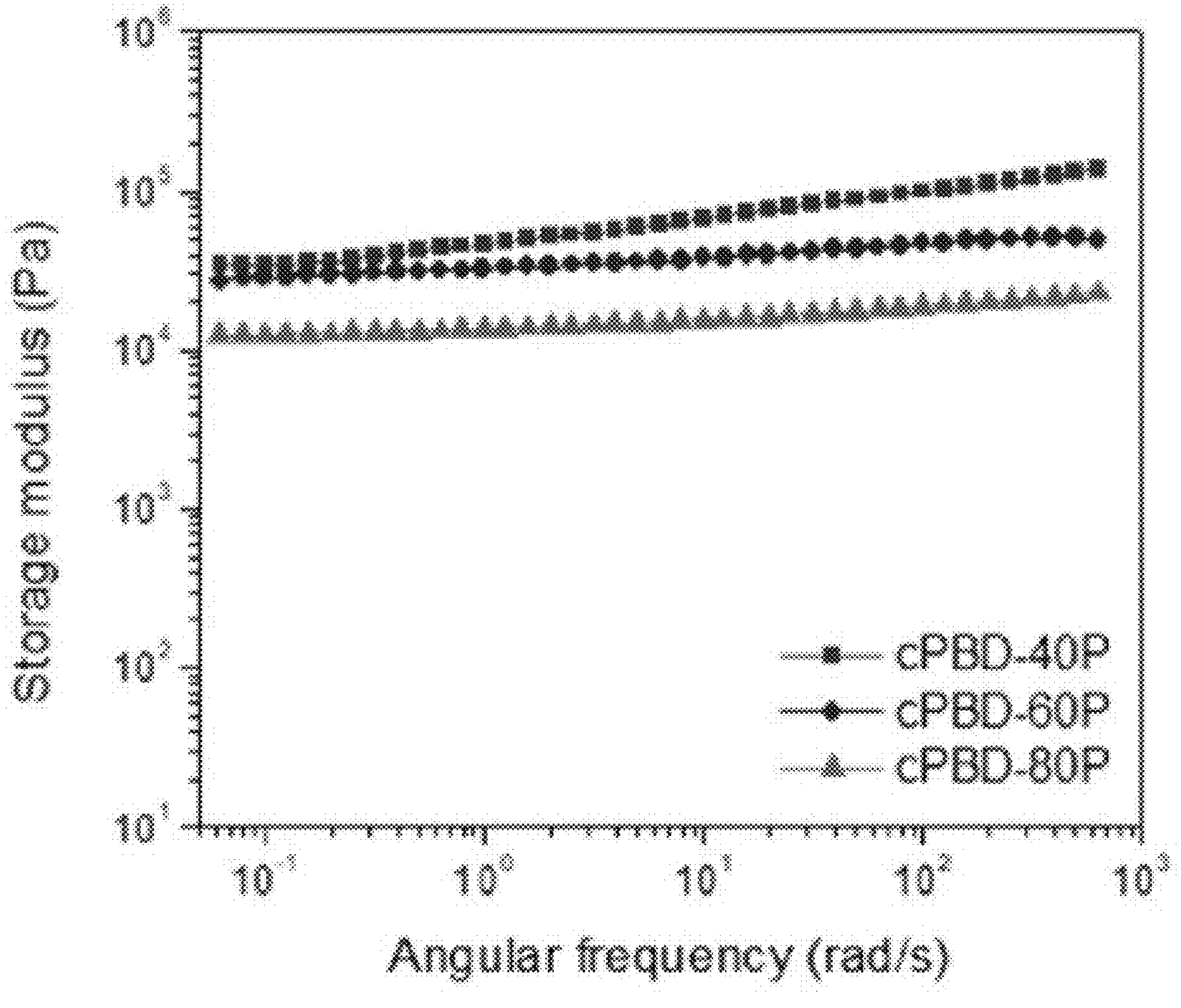
Figure 1E:
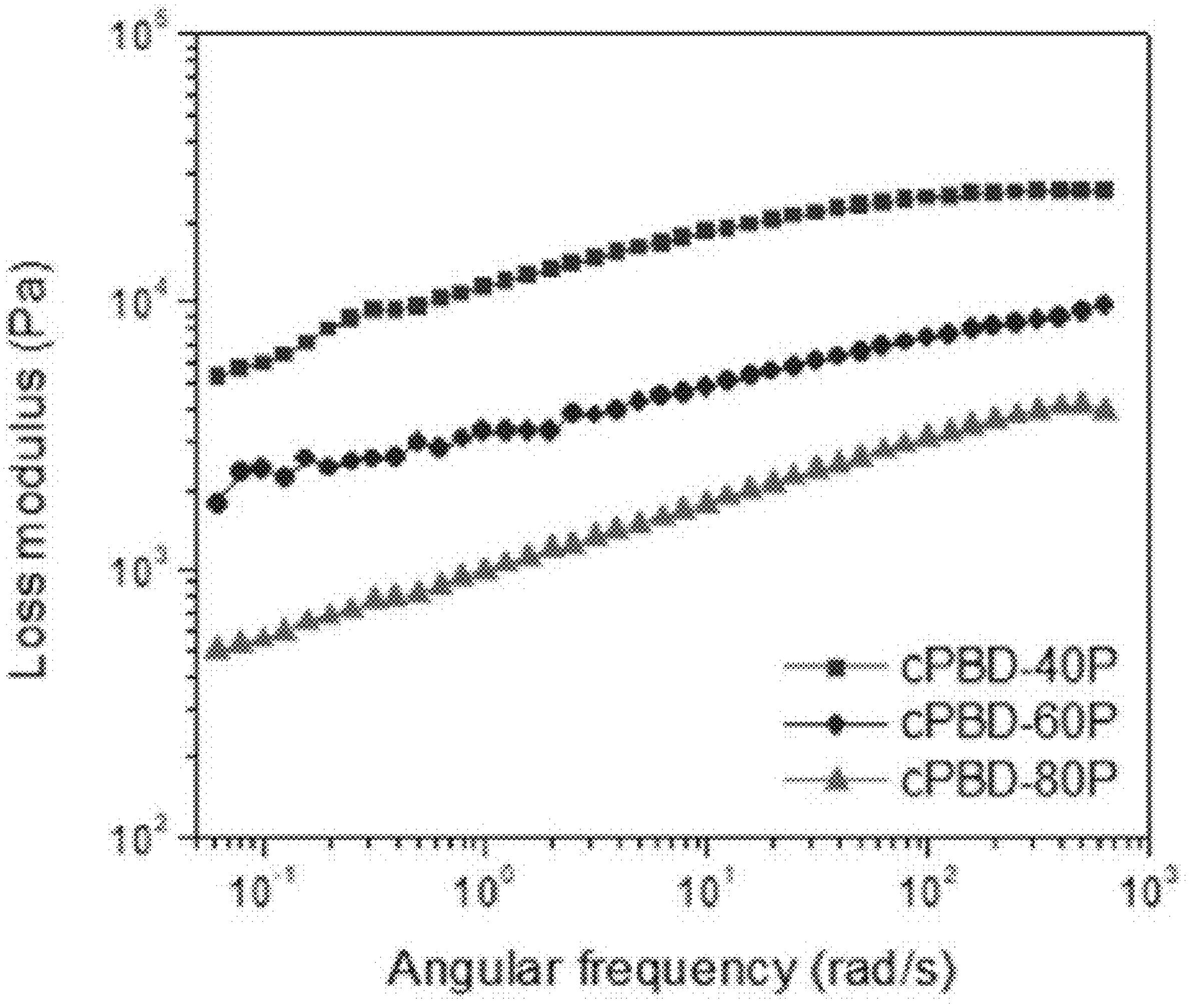
Figure 1F:
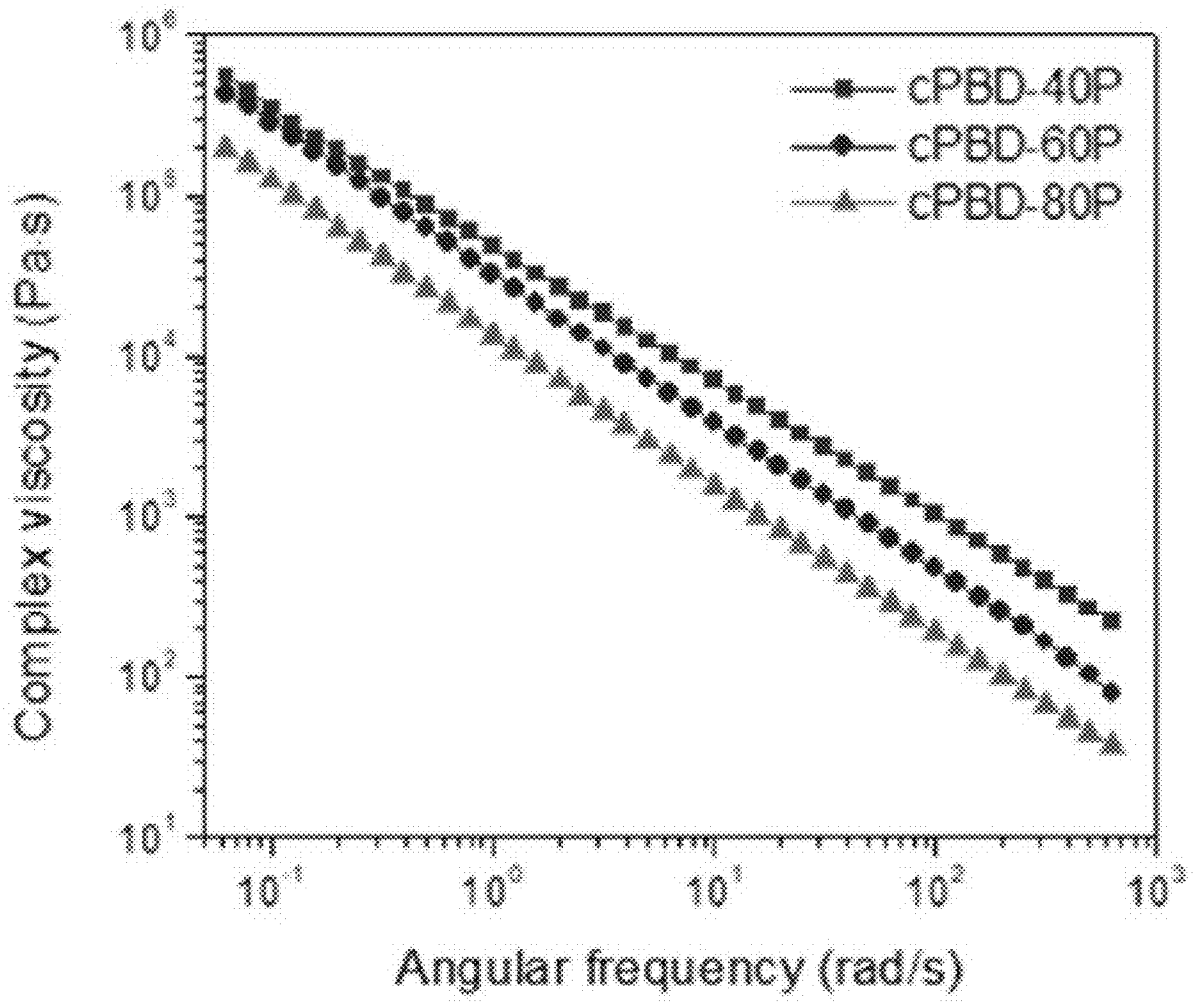

The addition of plasticizer can obviously change the viscoelastic behaviors of polymers. The storage modulus, loss modulus, and complex viscosity for pure PBD and PBD with various amounts of plasticizer were characterized by rheometer. First, the effect of oscillation strain on viscoelastic behavior was studied to determine the linear viscoelastic region. With increasing the content of plasticizer, the linear viscoelastic region extended to higher oscillation stain. Within the linear region, the 1% oscillation strain was selected to conduct the frequency sweep test. FIGS. 1A-1F compare the storage modulus, loss modulus, and complex viscosity of uncrosslinked and UV crosslinked PBD organogels, respectively. As shown in FIGS. 1A-1C, certainly, the more the plasticizer incorporated, the lower the modulus and viscosity obtained. The reduction by orders of magnitude can be observed. These results suggest that the obtained PBD gels are injectable and can be printed by the conventional UV assisted extrusion printer. FIGS. 1D-1E show the results of UV crosslinked PBD organogels. Different from the uncrosslinked specimens, the moduli of crosslinked PBD organogels are not that sensitive to the angular frequency. The modulus is significantly increased after UV crosslinking, indicating the successful polymerization of the PBD organogels. Moreover, the difference between the storage modulus and complex viscosity before and after UV crosslinking is much reduced, which indicates that all the crosslinked PBD organogels have strong enough mechanical properties to be used as solid materials.

Thermal and Dynamic Mechanical Analysis

Figure 2A:
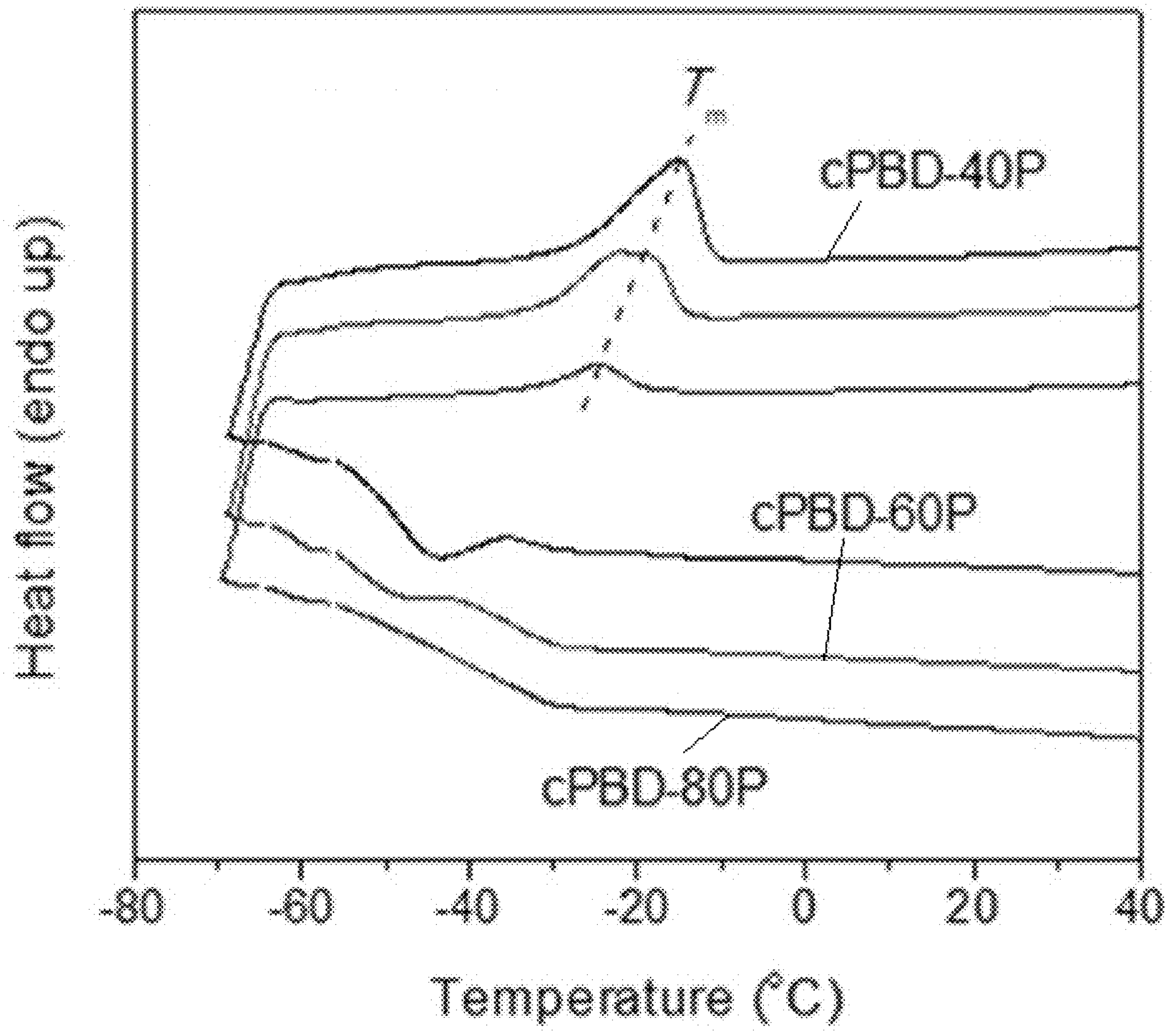
FIGS. 2A-2D show profiles of (FIG. 2A) heat flow, (FIG. 2B) storage modulus, (FIG. 2C) loss modulus, and (FIG. 2D) tan delta versus temperature for crosslinked PBD based organogels.
Figure 2B:
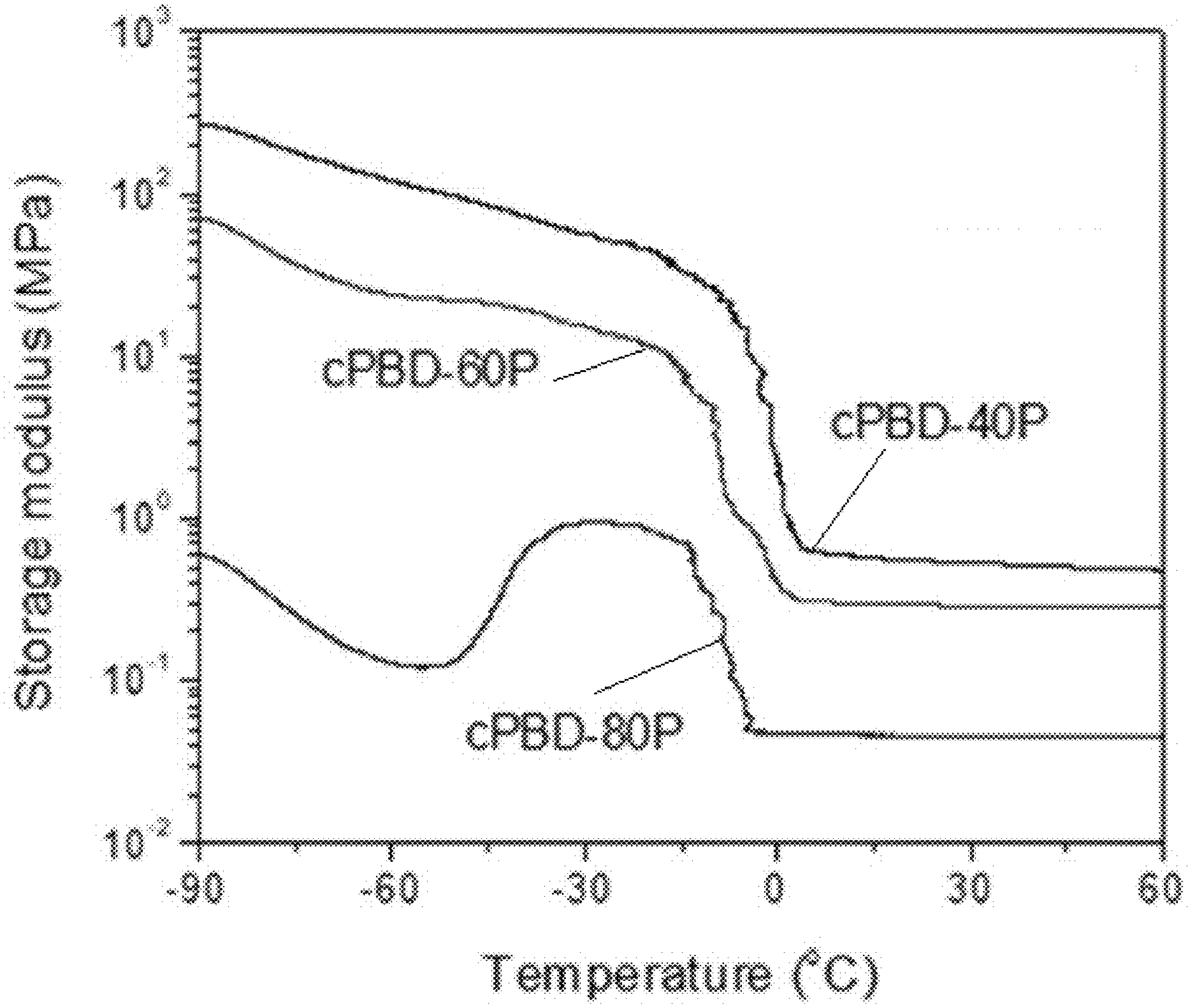
Figure 2C:
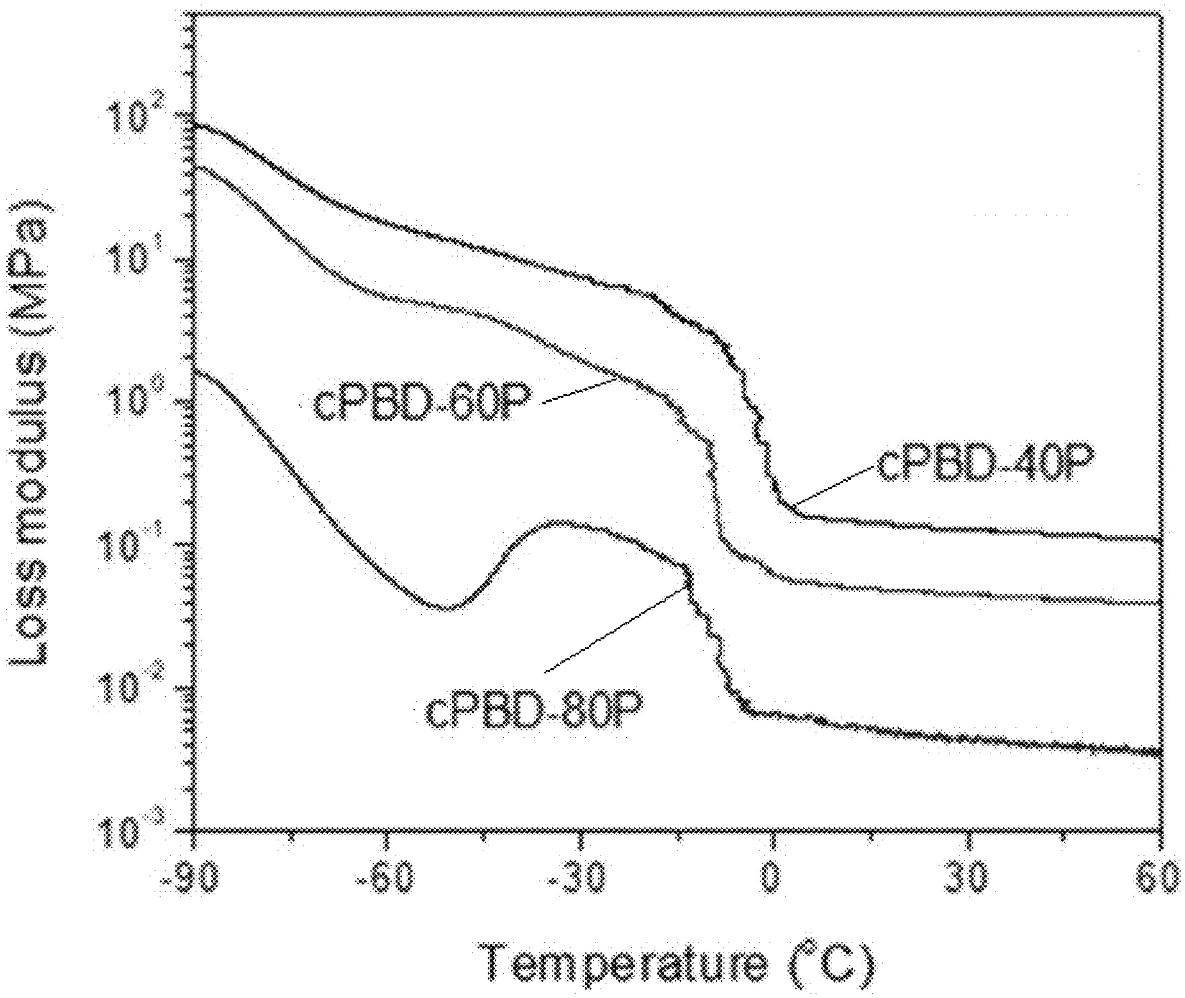
Figure 2D:
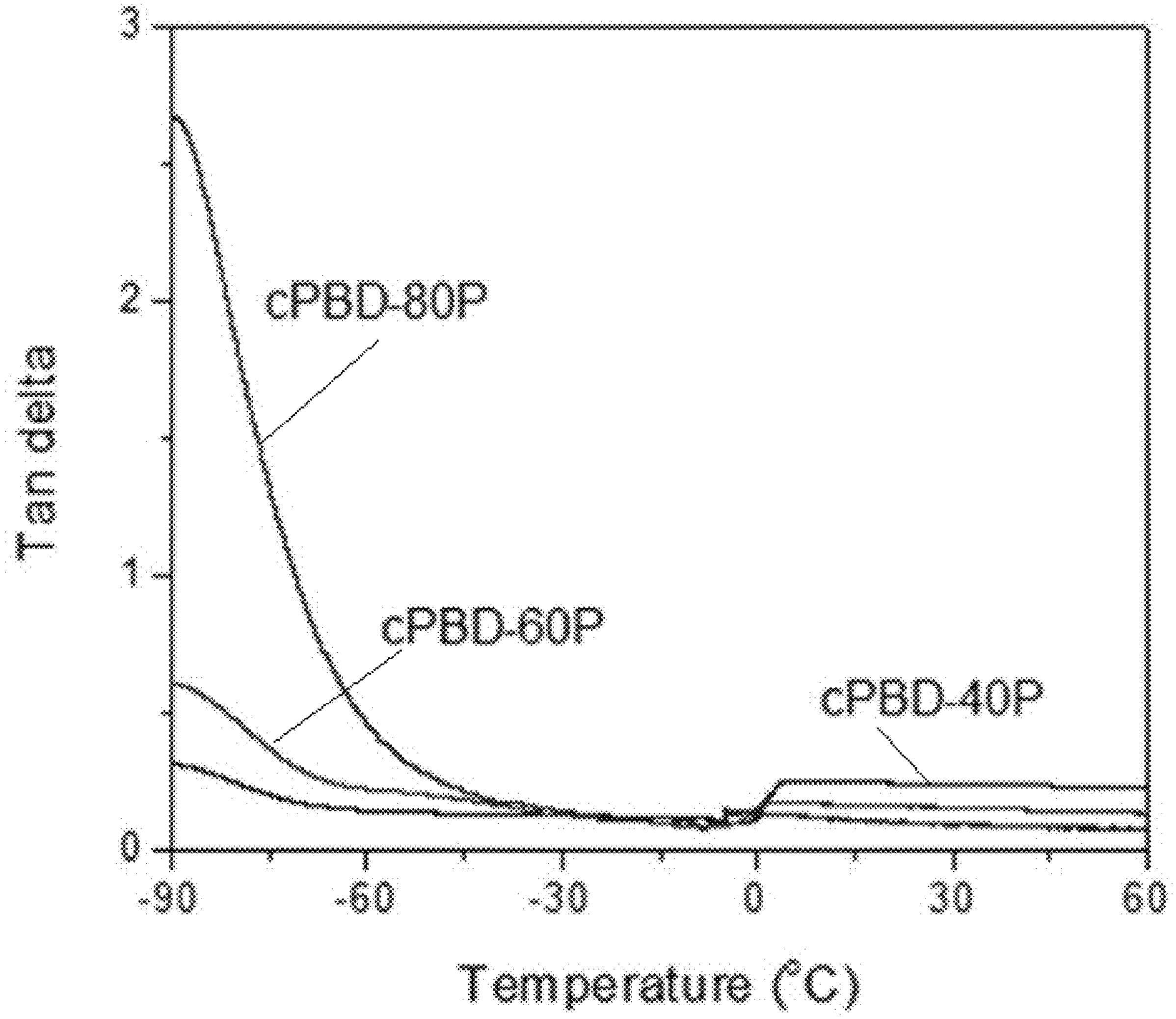

Thermal properties of crosslinked PBD based organogels were characterized by DSC, and the corresponding profiles were displayed in FIG. 2A. The melting point ($T_m$) of the crosslinked PBD is −8.7° C. The addition of plasticizer gradually decreased the $T_m$ and degree of crystallinity, as demonstrated by the left-shifted and reduced endothermic melting peaks. The $T_m$ values for c-PBD-40P, c-PBD-60P, and c-PBD-80P are −14.8° C., −20.4° C., and −24.4° C., respectively. A similar variation trend can be observed for the exothermic crystallization peaks. The large amount of small plasticizer molecules heavily restrains the rearrangement and formation of crystals for crosslinked PBD. Additionally, the modulus of PBD based organogels were dramatically decreased with adding plasticizer. FIGS. 2B-2C display the storage modulus and loss modulus of the specimens. One can see that the c-PBD-80P sample exhibits the lowest storage modulus and loss modulus, which decreased by two orders of magnitude. In FIG. 2D, with increasing temperature from −90° C. to −50° C., the tan delta value decreases, probably due to the glassy-rubbery transition of the PBD segments. Generally, the huge difference in modulus before and after the transition is a critical factor in achieving good shape memory effect.

Environmental and Thermal Stabilities

Figure 3A:
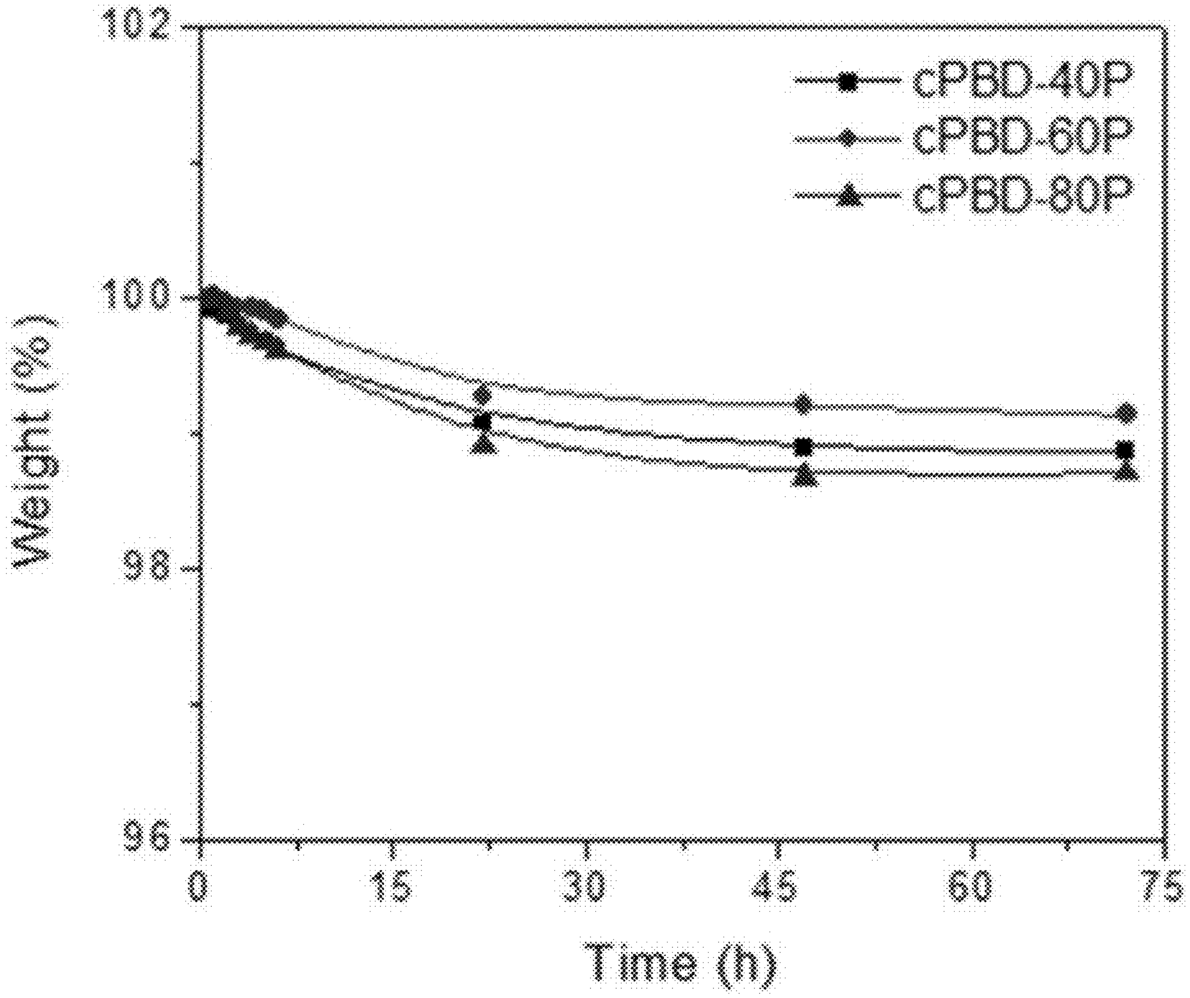
FIGS. 3A-3D show (FIG. 3A) weight loss of crosslinked PBD based organogels at different vacuum drying time. Profiles of (FIG. 3B) storage modulus, (FIG. 3C) loss modulus, and (FIG. 3D) tan delta versus temperature for crosslinked PBD based organogels after 72 h vacuum drying at room temperature.
Figure 3B:
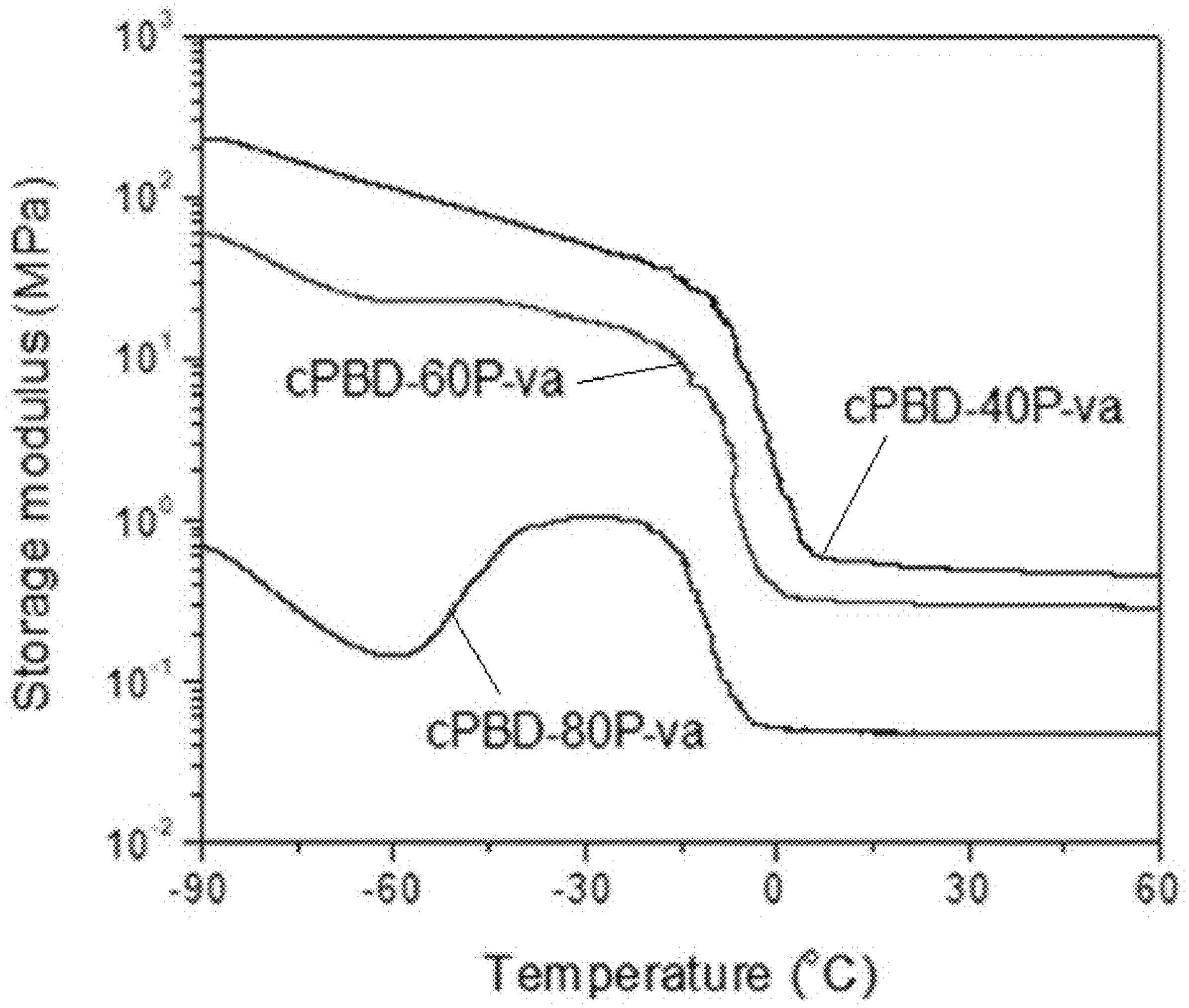
Figure 3C:
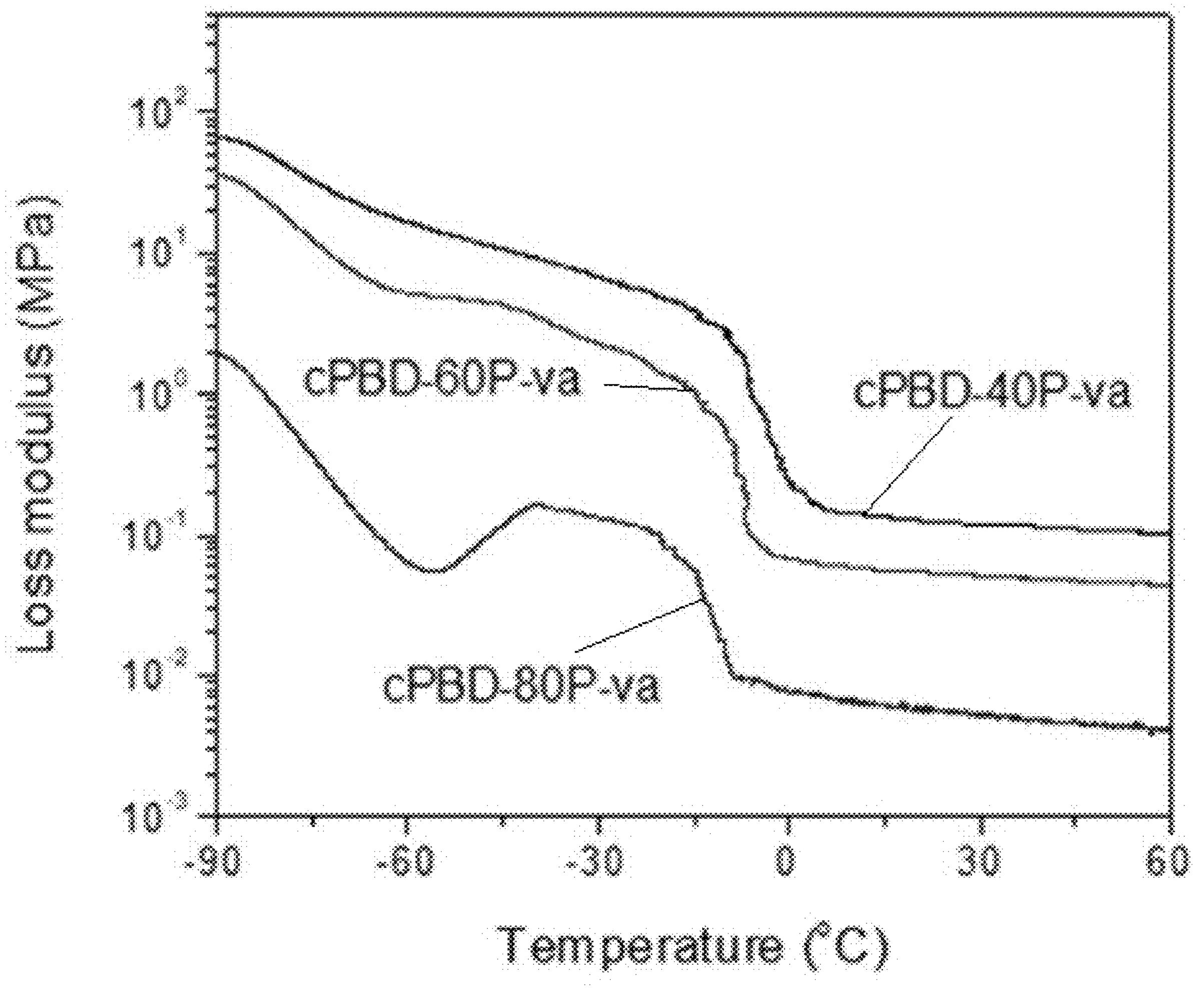
Figure 3D:
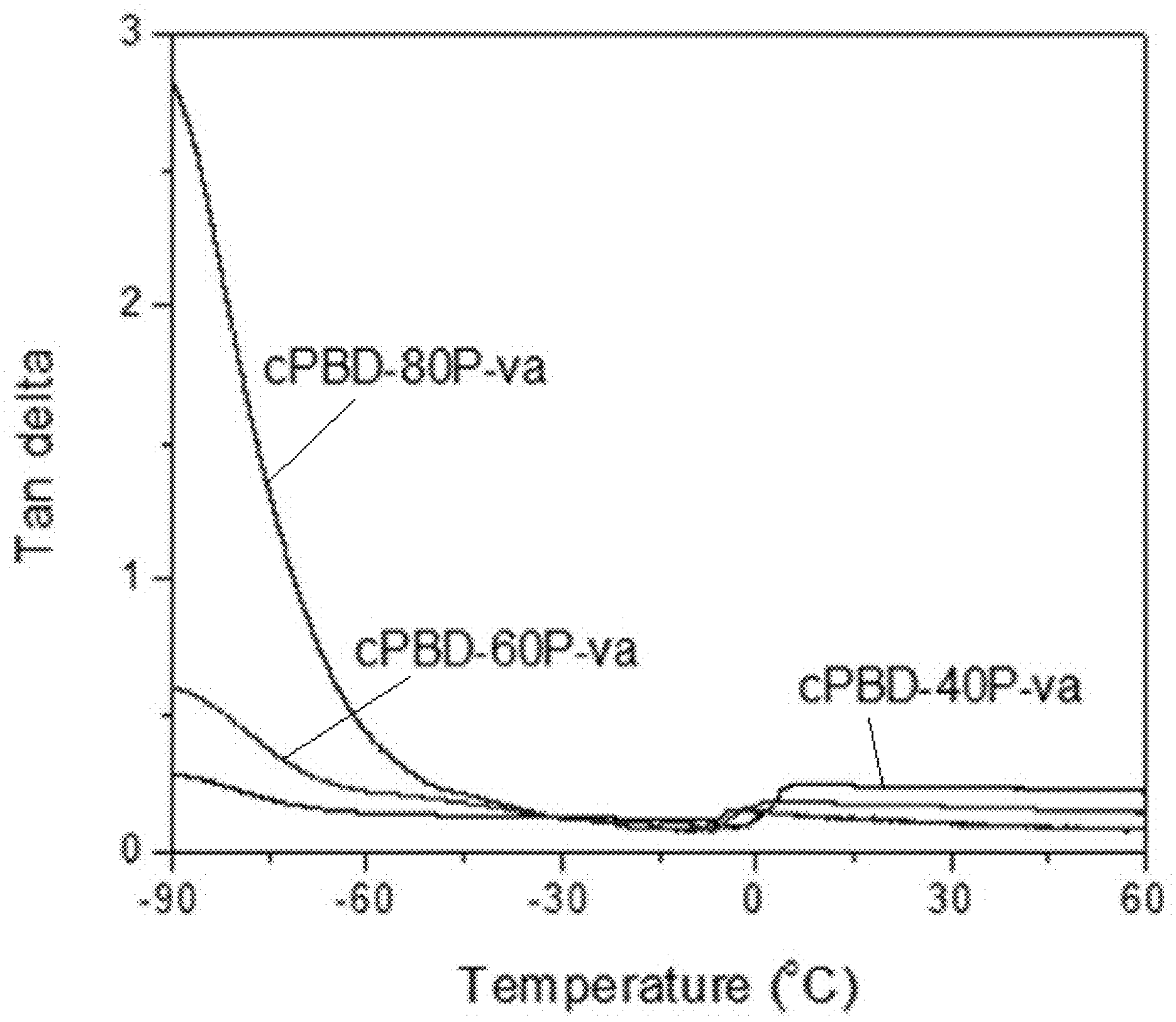

For the purpose of durability, the stabilities of organogels are of great importance in practical applications. The environmental stability was characterized by placing PBD based organogels in a high vacuum environment. The weight change of the organogels under $6\times10^{-4}$ Pa environment was recorded and shown in FIG. 3A. Except for the initial weight loss caused by impurities, the weight of the samples is stable after 48 h. For the highest weight loss, only 1.3% can be found for cPBD-80P specimen. Because bis(2-ethylhexyl) phthalate is nonvolatile and hydrophobic, the weight of the PBD based organogels was almost unchanged even after storing for 72 h in the vacuum environment, demonstrating that the PBD based organogels are ultrastable in open air. To better illustrate the environmental stability, the specimens after vacuum drying for 72 h were characterized by DMA and the corresponding results are profiled in FIGS. 3B-3D. One can observe the highly repeatable storage modulus, loss modulus, and tan delta curves for all three samples. It suggests that the PBD based organogels can fully maintain their thermal and mechanical performance in high vacuum environment, thus leading to the ultrastability in ambient environment.

Figure 4A:
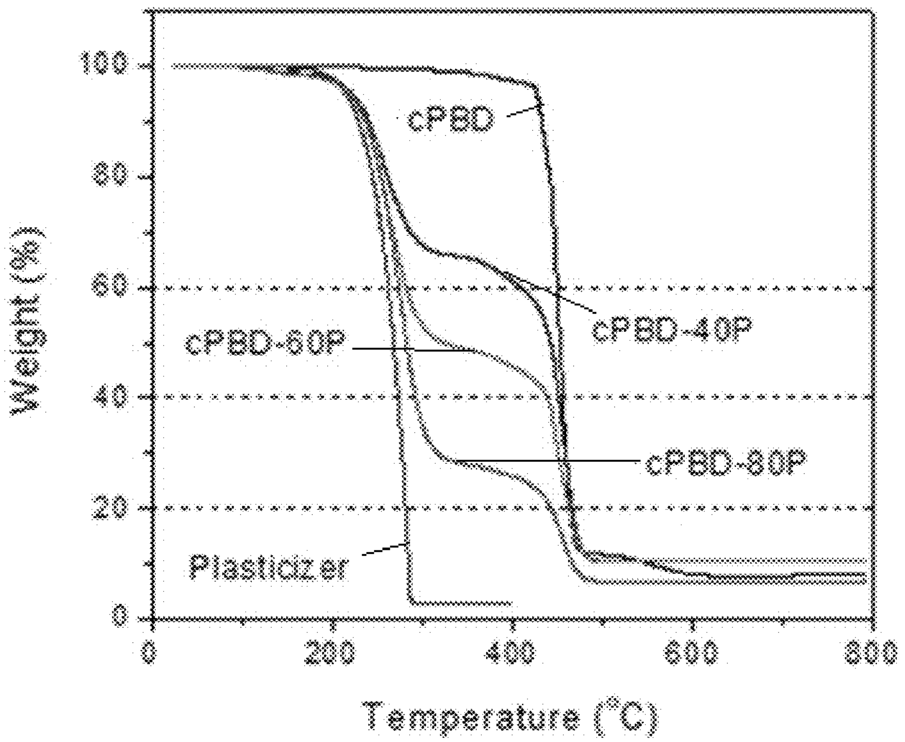
FIGS. 4A-4B show (FIG. 4A) Non-isothermal and (FIG. 4B) isothermal TG curves of different samples at 100° C.
Figure 4B:
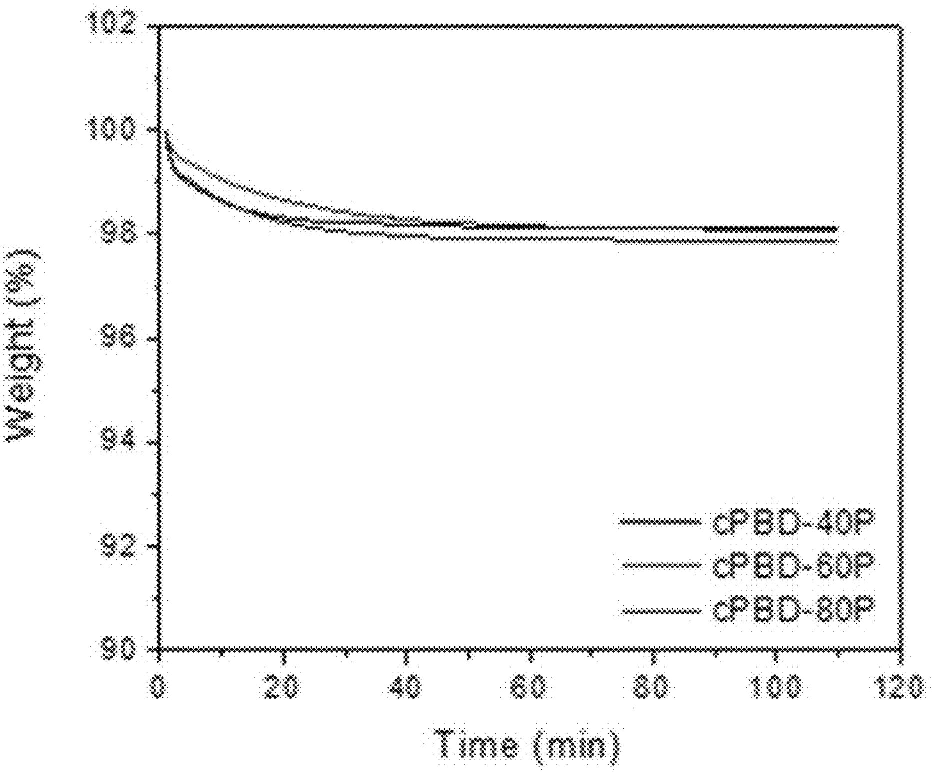
Figure 5A:
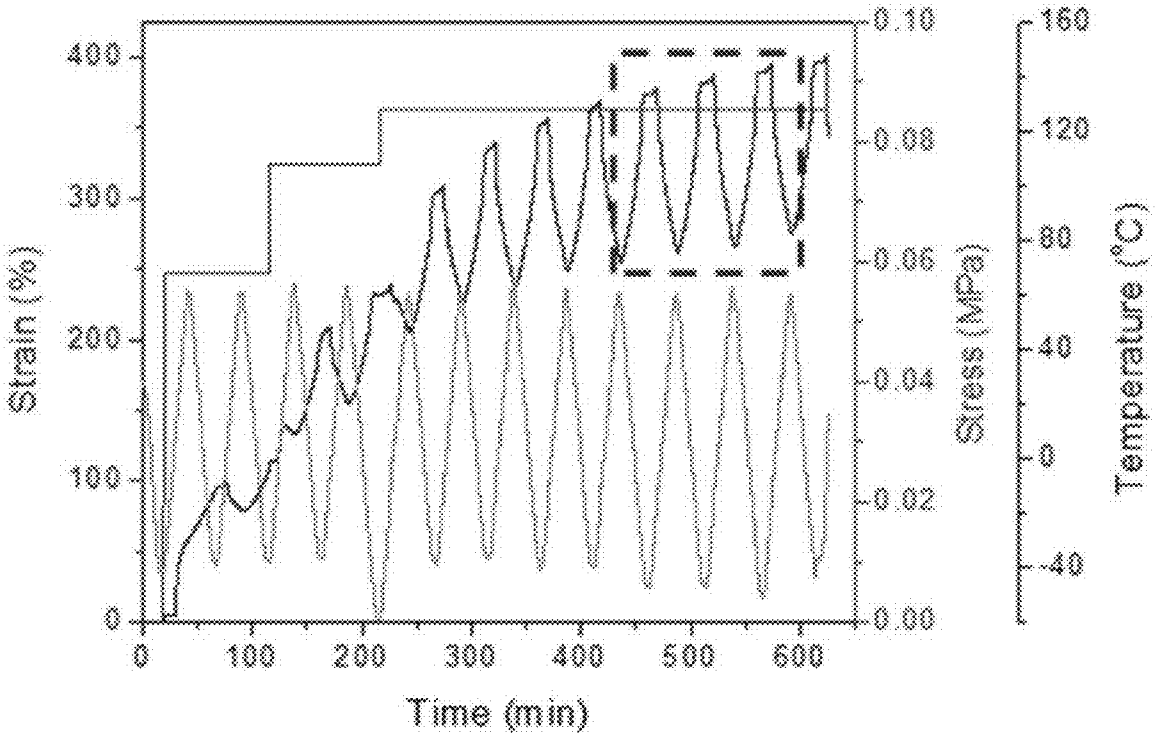
FIGS. 5A-5F show two-way shape memory properties of the (FIGS. 5A-5B) cPBD-40P, (FIGS. 5C-5D) cPBD-60P, and (FIGS. 5E-5F) cPBD-80P. The right column is the enlarged figure of each part circled by the red box on the left figures
Figure 5B:
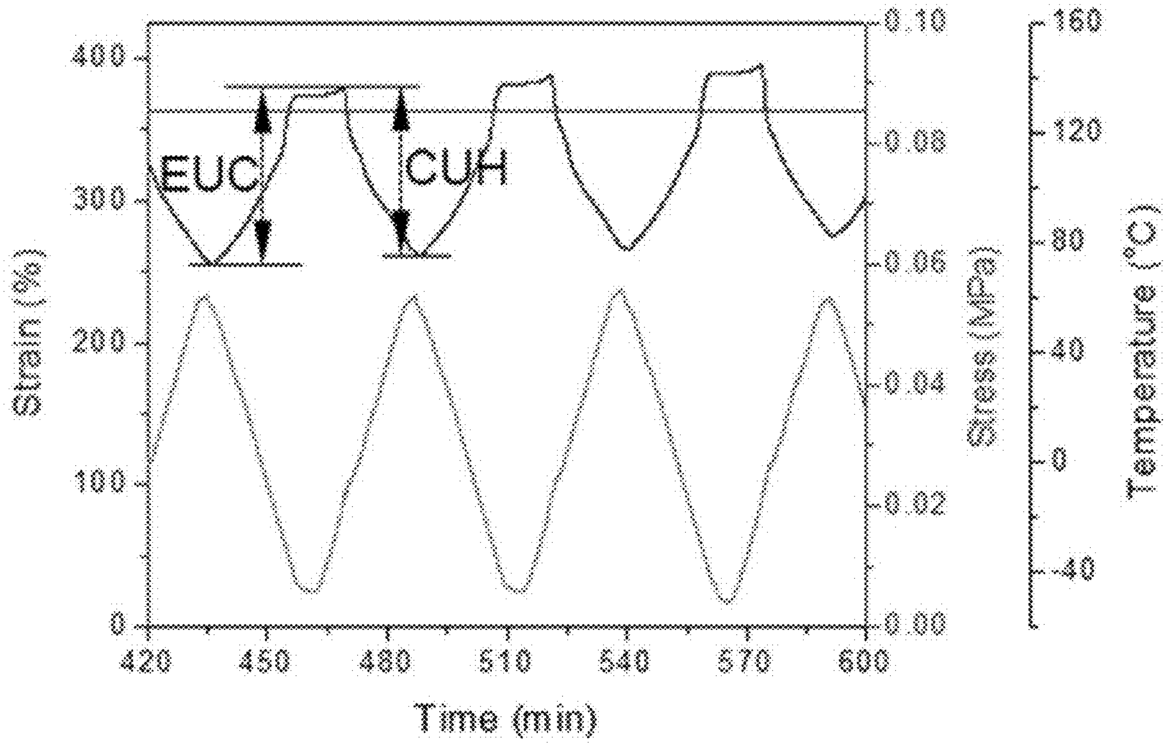
Figure 5C:
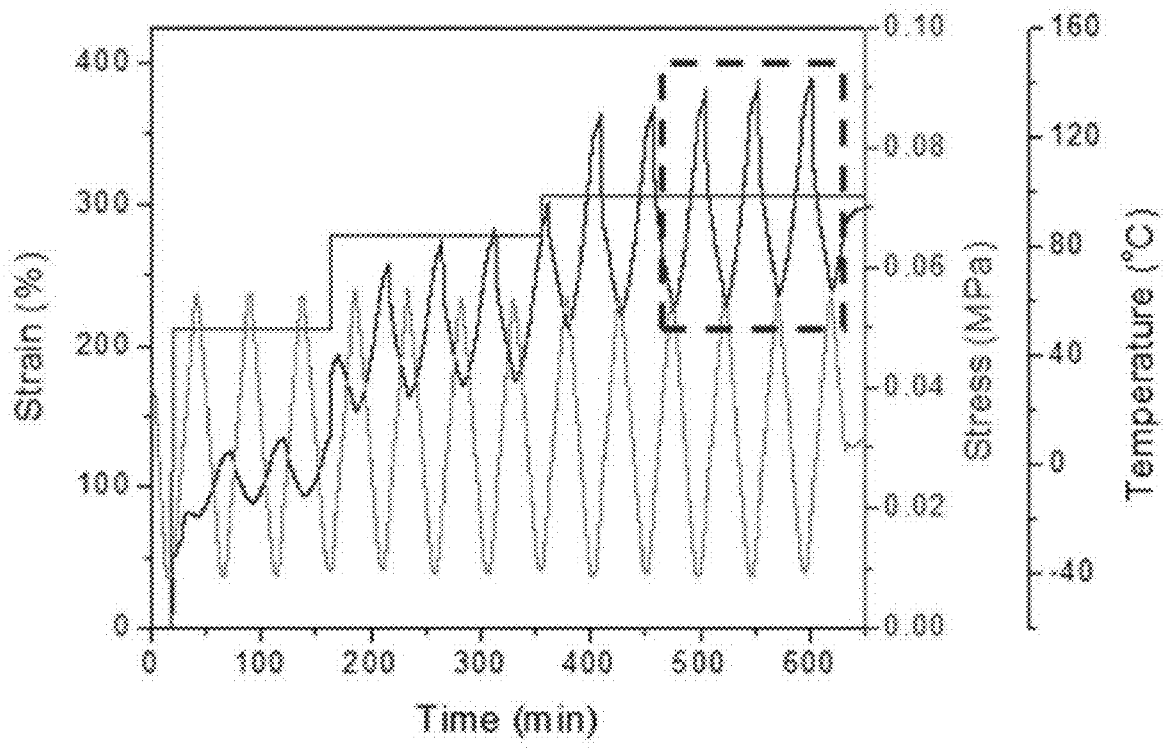
Figure 5D:
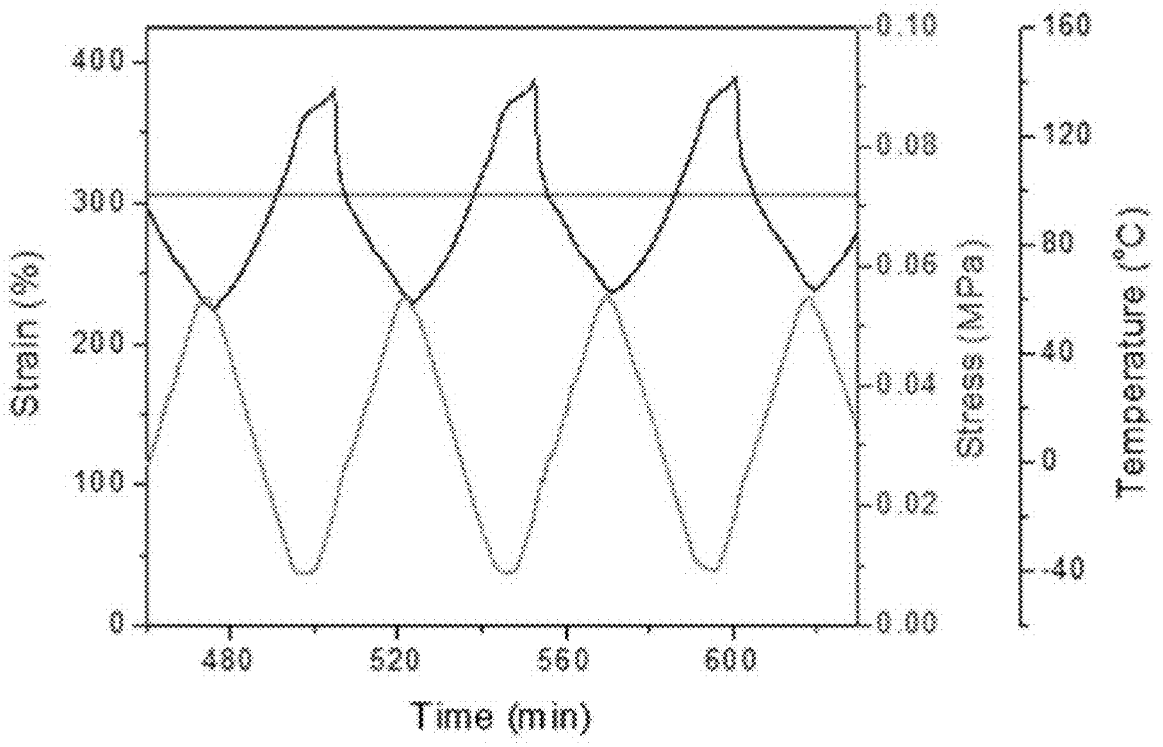
Figure 5E:
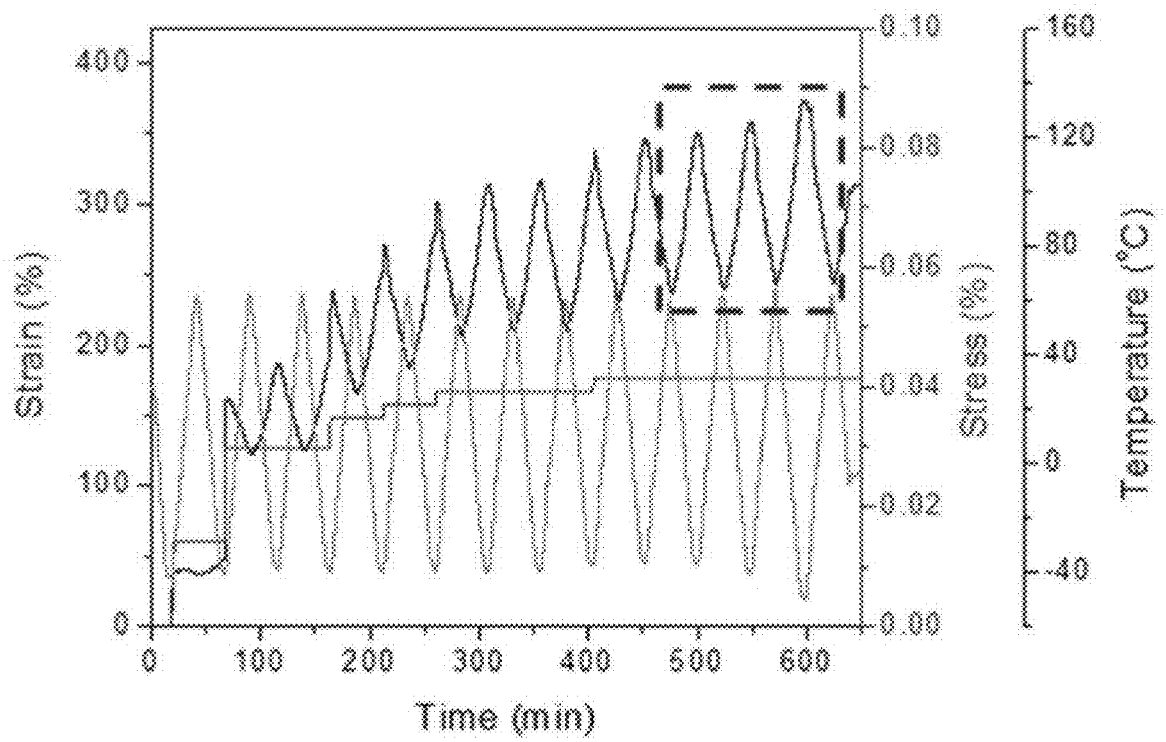
Figure 5F:
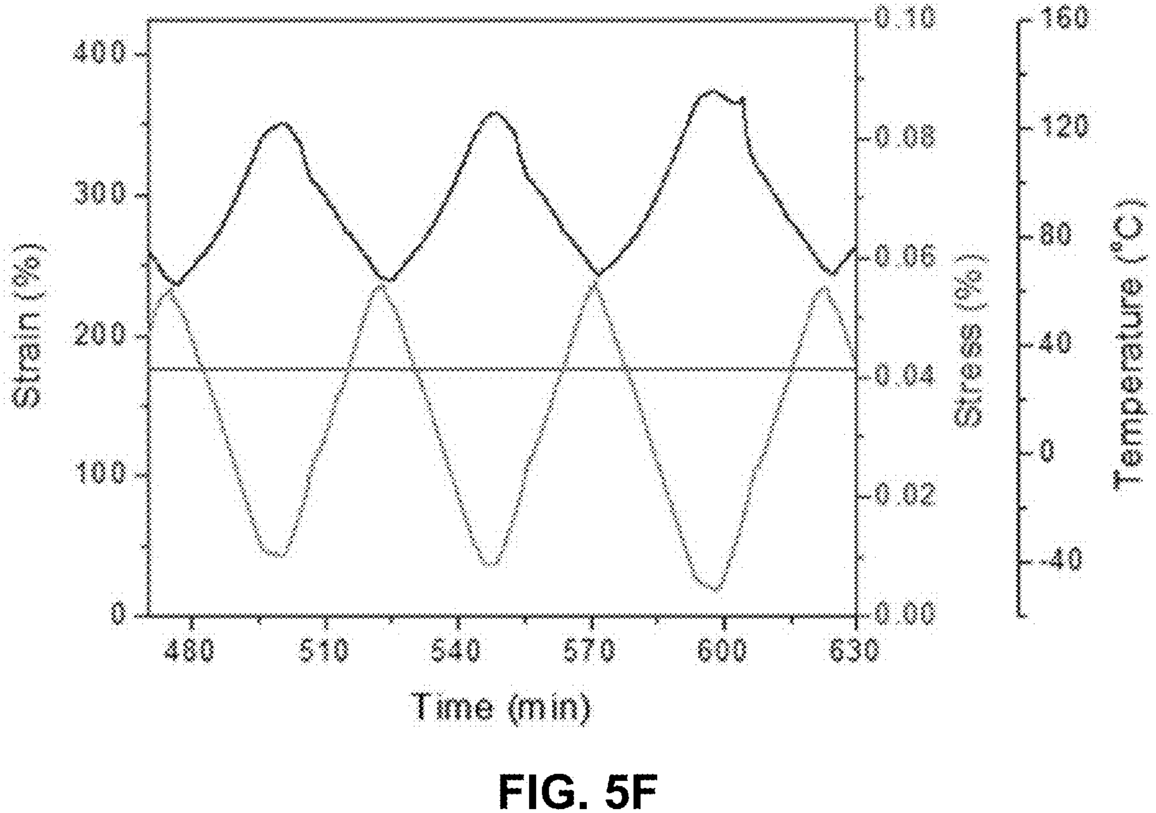

Thermal stability is another critical property for thermally triggered shape memory polymer systems. The non-isothermal test in inert atmosphere was conducted first to evaluate the thermal decomposition behaviors of PBD based organogels, as shown in FIG. 4A. Both pure cPBD and plasticizer follow a single step decomposition process, corresponding to the dissociation of backbone and main structure. For PBD based organogels, one can clearly observed two separate decomposition steps ascribed to the cPBD and plasticizer, respectively, which indicates that the addition of plasticizer rarely affects the decomposition behavior of cPBD. However, the residual weight after the first decomposition step is much higher than the theoretical value, which indicates that the cross-linked PBD networks obviously restrain the decomposition rate of plasticizer. Additionally, the isothermal test at 100° C. was performed to illustrate the thermal stability of PBD based organogels. Only ~2% weight loss can be observed after ~2 h at 100° C., which might be attributed to the impurities. This means that the PBD based organogels have an excellent stability in consideration of the temperature window (−40° C. to 60° C.) for two-way shape memory effect, which is discussed in the following section.

Two-Way Shape Memory Performance

FIGS. 5A-5F display the two-way shape memory results that conducted between −40° C. to 60° C. subjected to a constant external tensile force. A representative reversible elongation upon cooling and contraction upon heating effect are found. Because of the stress induced crystallization effect, within a reasonable load range, the larger the external load, the better the two-way shape memory effect, including higher elongation upon cooling (EUC) and contraction upon heating (CUH). After optimizing the external force and stabilization, at least three repeatable and stable actuation cycles can be obtained, which are highlighted by the dotted red line in FIGS. 5A, 5C, and 5E, and are magnified correspondingly in FIGS. 5B, 5D, and 5F. The average EUC and CUH for the cPBD-40P are 126% and 120%, respectively, and the external force is 0.085 MPa. By actuating within the same temperature range, the cPBD-60P specimen exhibited the highest actuation strain (FIG. 5B), of which the EUC and CUH are 156% and 151%, respectively. When the content of plasticizer was increased to 80 wt %, lower actuation strain (121% and 119%) and lower external force (0.041 MPa) were observed. These results suggest that an optimized content of plasticizer is necessary to achieve the best two-way shape memory actuation strain. Moreover, the cPBD-60P exhibited the highest actuation stability with low strain creep. After 3 cycles (FIGS. 5B, 5F, and 5F), the creep strain of the cPBD-60P is 9%, while those of the cPBD-40P and cPBD-80P are 17% and 22%, respectively. All these results demonstrate that the cPBD-60P specimen has the best overall two-way shape memory performance. It is believed that the giant reversible EUC and CUH of the cPBD-60P organogel is attributed to the combination effect of entropic elasticity and crystallization/melting transition. It is worth mentioning that, in a previous study, Yan et al. quantified the contribution of rubber elasticity and melt/crystallization on the two-way shape memory effect of PBD. They showed that in rubbery state, the two-way shape memory effect is due to rubber elasticity; at temperature below the crystallization temperature, the two-way shape memory effect is due to stress induced crystallization. Lu et al. conducted in situ X-ray diffraction (XRD), Raman spectroscopy, and cryogenic scanning electron microscopy (cryo-SEM) to disclose the mechanisms controlling the two-way shape memory effect of PBD. They also showed that the increase in crystallinity as temperature drops accounts for the EUC. In this current work, although the addition of plasticizer may change the crosslinked network, it is believed that the mechanisms for the two-way shape memory effect of the organogel are similar to those of the pure PBD network.

Figure 6:
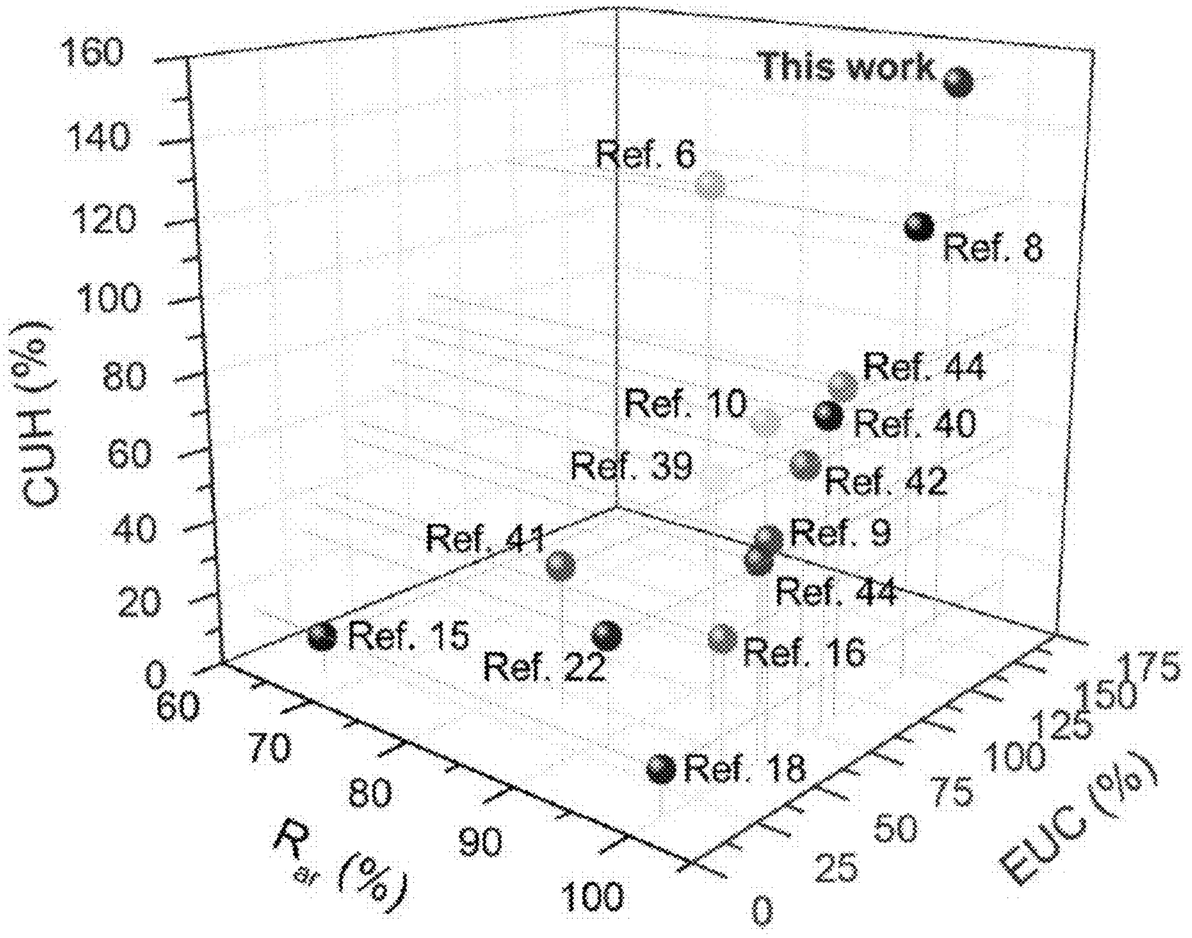
FIG. 6 shows a performance comparison of two-way shape memory polymers.

The comparison of two-way shape memory properties has been made to further validate the better performance of cPBD-60P organogel. As shown in FIG. 6, the EUC, CUH, and actuation reversibility ($R_{ar}$) are displayed. The $R_{ar}$ is defined as the ratio of CUH to EUC, to evaluate the reversible actuation performance. One can see that the cPBD-60P organogel exhibited the highest CUH and EUC compared to those reported two-way shape memory systems. Additionally, the $R_{ar}$ is 97% for cPBD-60P organogel, which is comparable to the best ones. It means the cPBD-60P organogel possess record-high actuation strain and excellent reversibility at the same time. It certainly satisfies the critical requirements by soft robots demanding large actuation strain. Moreover, the temperature for triggering two-way shape memory effect of cPBD-60P organogel is much lower than most of the two-way shape memory polymers. The two-way shape memory polymers with reversible actuation at subzero Celsius temperatures can be used as sealant to seal joints and cracks in pavements and bridge decks. The reason is that the joints open at lower temperature and narrow at higher temperature, therefore, a sealant should behave opposite to this behavior. Other outdoor applications may also include gasket for pipe-lines, which are a critical component for oil and gas transport, and for singles in the roof, which are exposed to daily temperature fluctuations.

Mechanical Properties

Figure 7A:
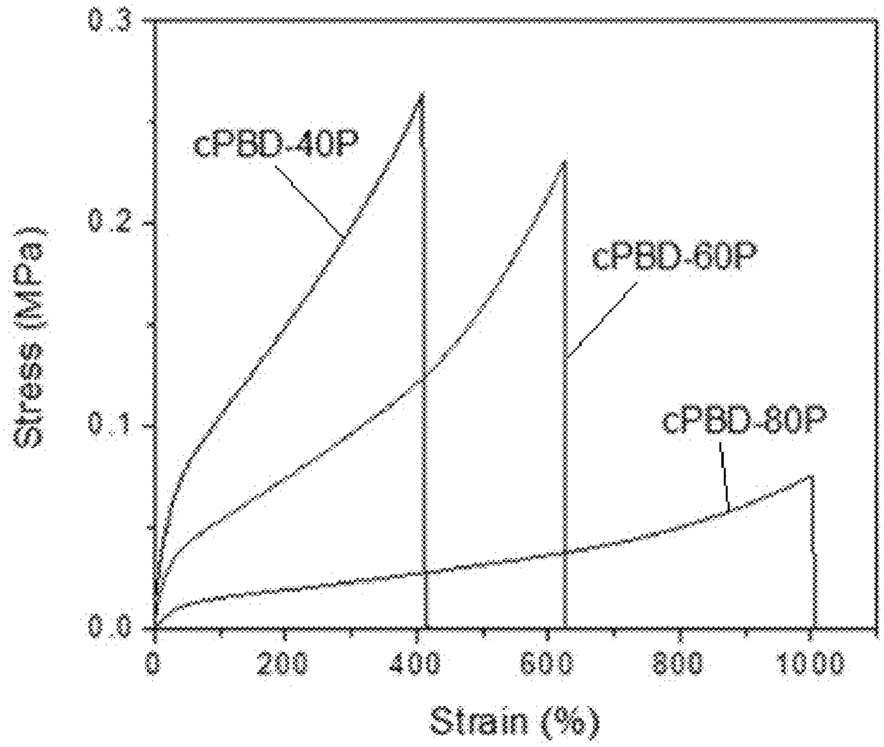
FIGS. 7A-7D show tensile stress-strain curves of (FIG. 7A) crosslinked PBD based organogels at stretching rate of 20 mm/min, and (FIG. 7B) cPBD-60P sample at different stretching rates. Loading-unloading cycle curves of cPBD-60P sample at stretching strain of (FIG. 7C) 50% and (FIG. 7D) 100%.
Figure 7B:
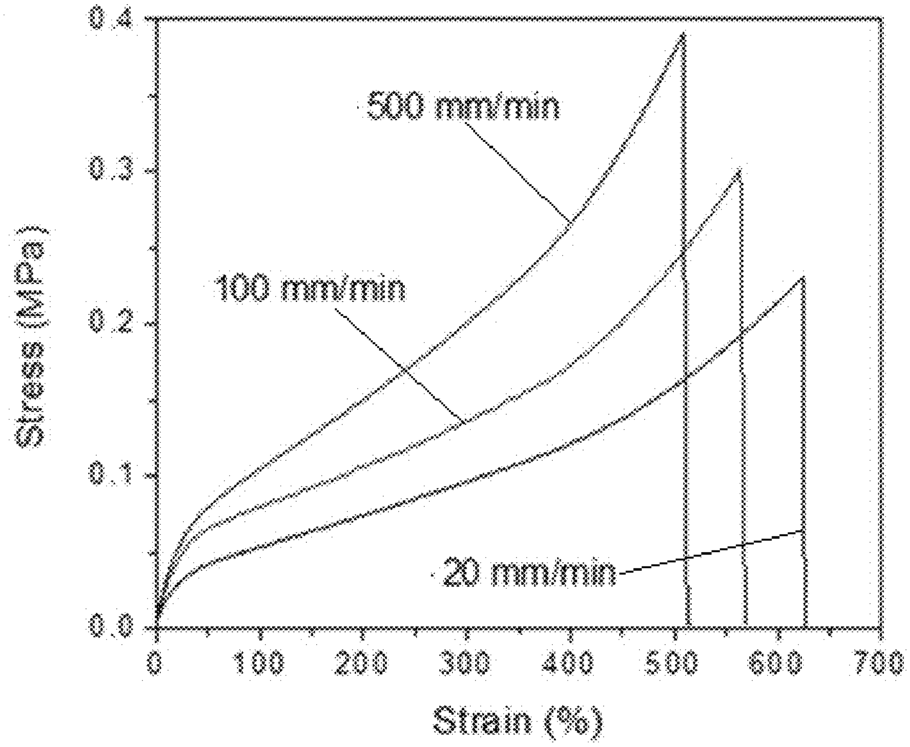
Figure 7C:
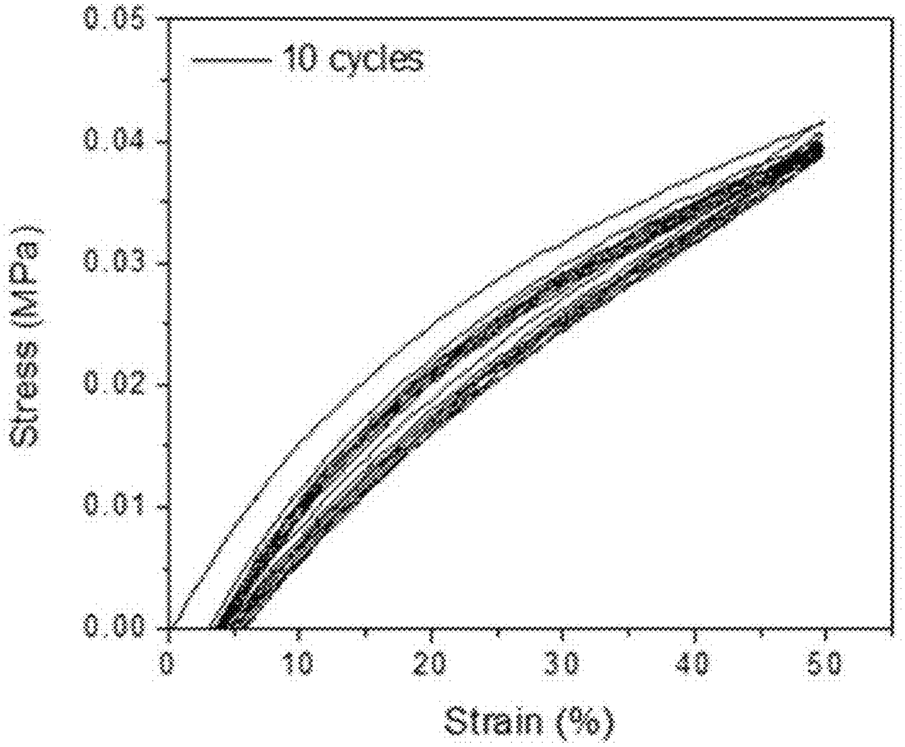
Figure 7D:
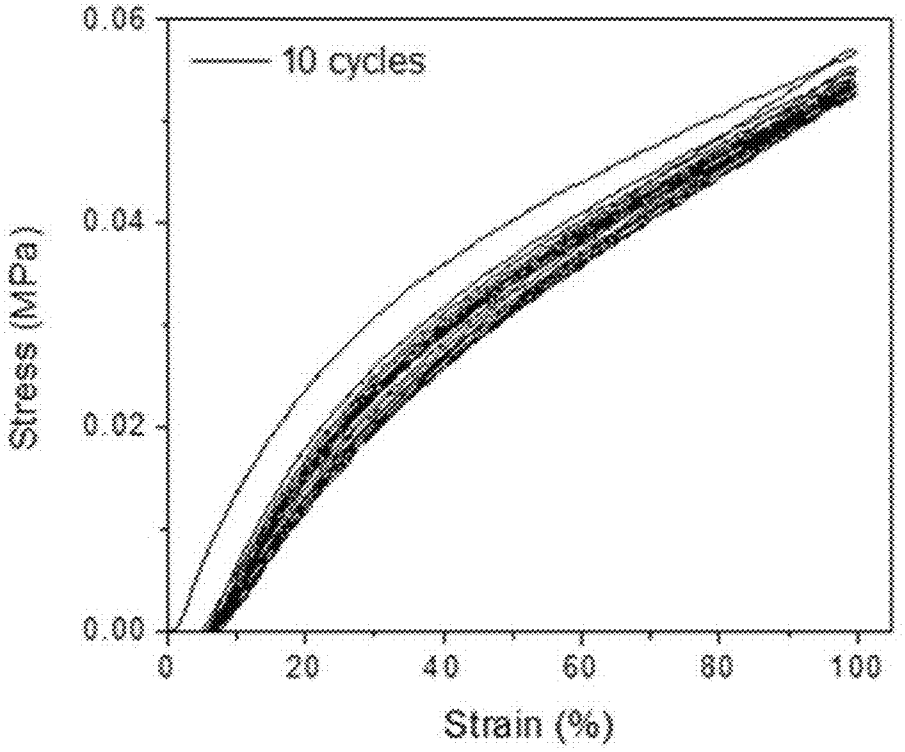
Figure 8A:
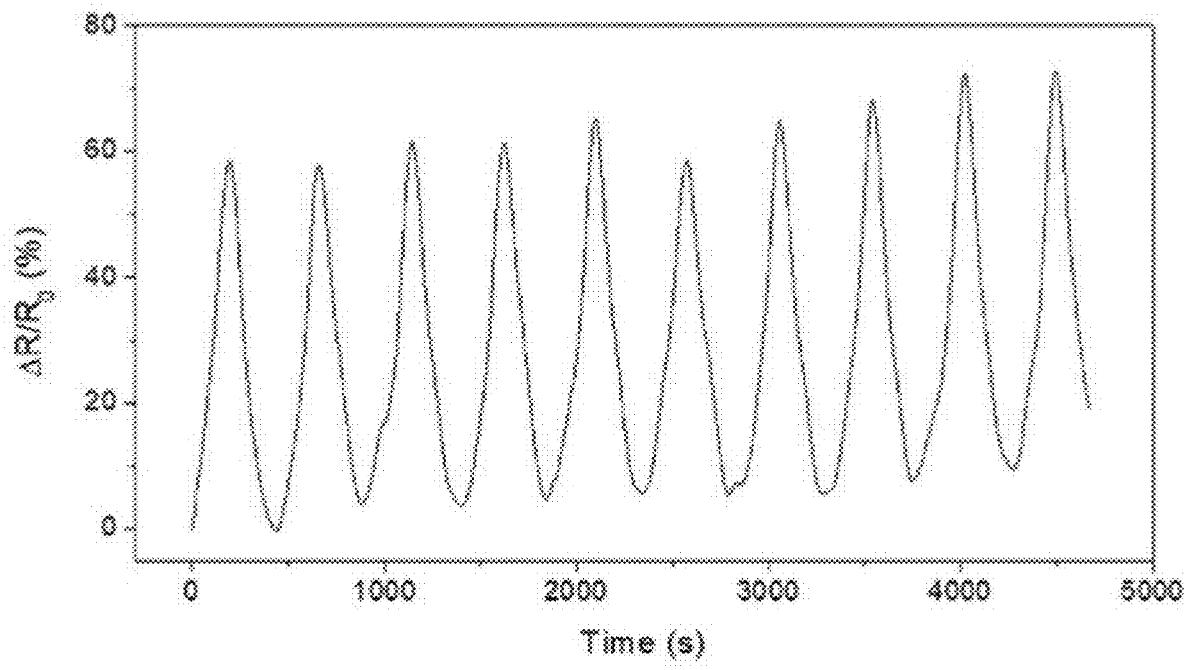
FIGS. 8A-8D show (FIGS. 8A-8B) relative resistance ratio variation of the cPBD-60P specimen during consecutive loading-unloading cycle tests under the maximum applied strain of (FIG. 8C) 20% and (FIG. 8D) 50%.
Figure 8B:
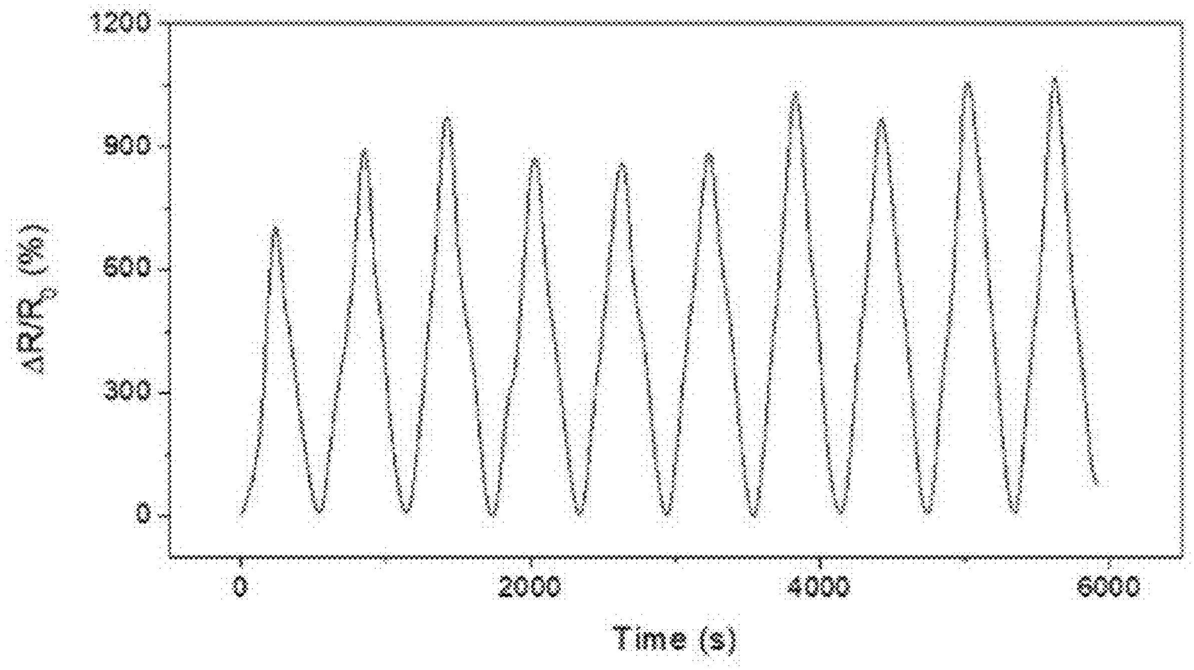
Figure 8C:
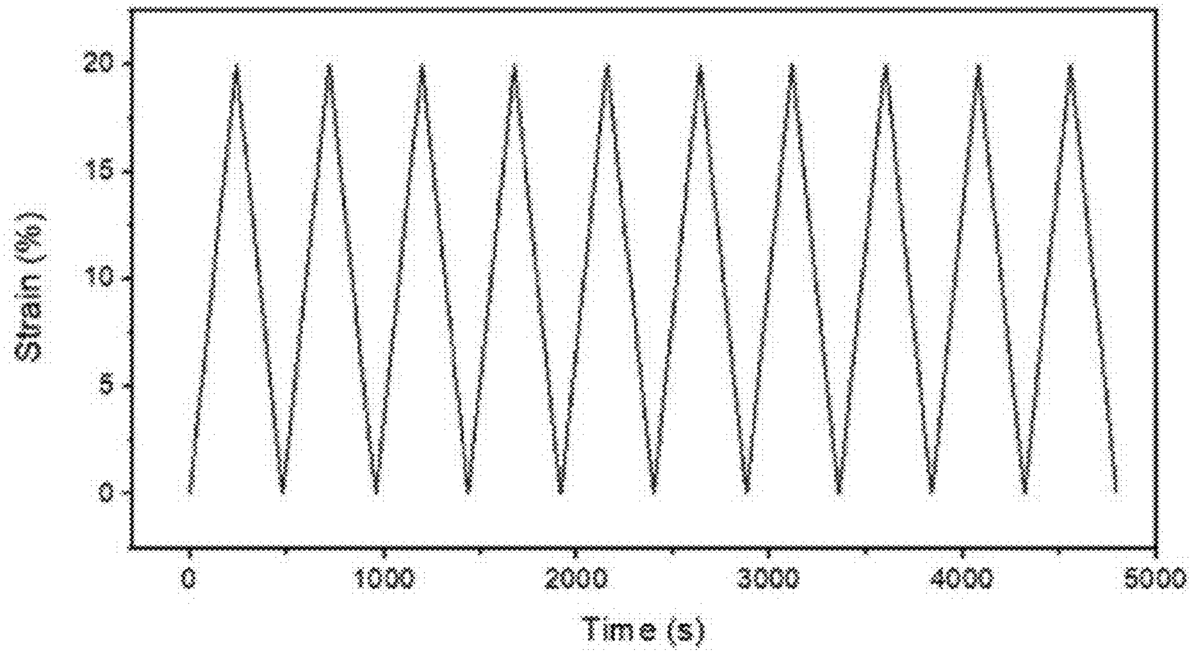
Figure 8D:
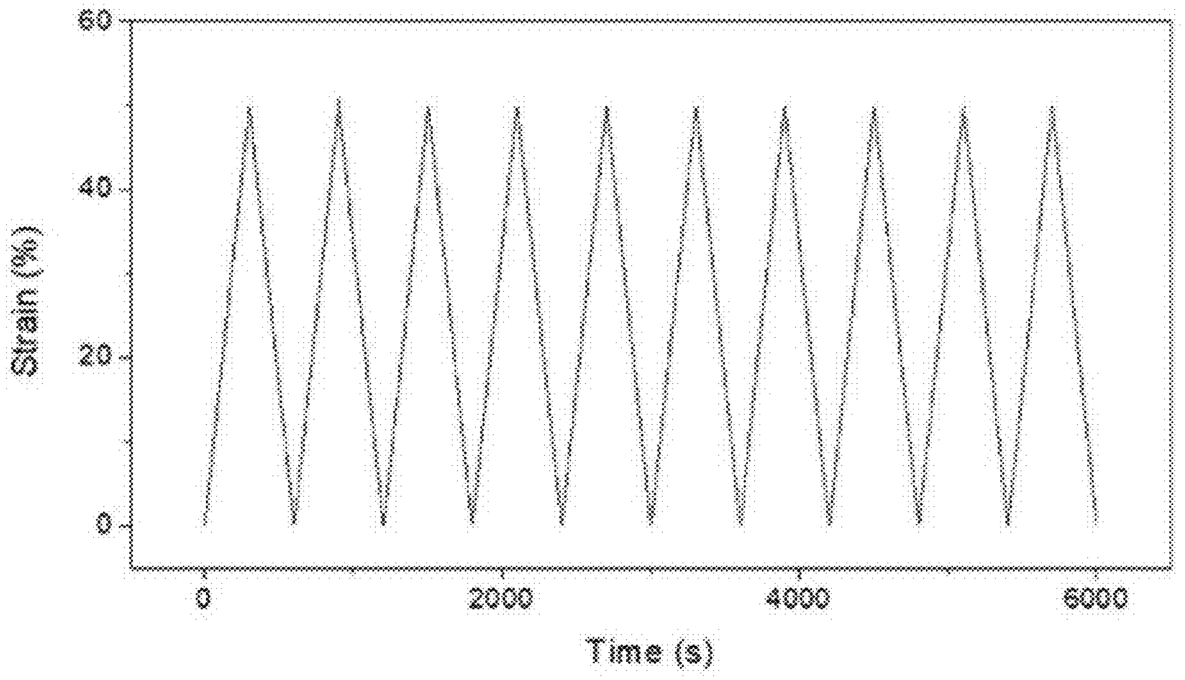

The PBD based organogels are stretchable and their mechanical properties are highly tunable by adding various amounts of plasticizer. As displayed in FIG. 7A, with increasing the content of the plasticizer, the elongation at break for the organogels increased from 409 to 999%. Certainly, the organogels exhibited monotonically decreased tensile strength (from 0.26 MPa to 0.08 MPa) and Young's modulus. FIG. 7B shows the stretching rate dependence of the tensile properties. The cPBD-60P specimen exhibited higher tensile strength and Young's modulus, but lower tensile fracture strain at a higher stretching rate. To better illustrate the mechanical performance, the cyclic loading-unloading tensile test were performed at stretching strain of 50% (FIG. 7C) and 100% (FIG. 7D), respectively. Small hysteresis loops and residual strains were observed in the loading-unloading cycles, which demonstrates the high resilience of the cPBD-60P specimen. Furthermore, except for the first cycle, the highly repeatable loading-unloading cycles indicate the stable mechanical properties and also suggest that no internal fracture of covalent bonds occurred.

Potential Application as Strain Sensor

Due to the stretchability, one promising application of the cPBD-60P sample is to serve as a strain sensor. The electrical conductivity can be easily achieved by a simple dry coating and hot-pressing procedure. The conductive multi-walled carbon nanotubes were tightly embedded on the surface of the cPBD-60P organogel. As displayed in FIGS. 8A-8D, the organogel sensor exhibited fast, reproducible, and reliable responses to small strain. After 10 loading-unloading cycles of stretching at a maximum tensile strain of 20% and 50%, respectively, the cPBD-60P organogel based sensor maintained its electrical resistance with no obvious change, suggesting the good electrical durability and dynamic electro-mechanical reliability. This promising performance may be used to monitor various movements, such as human motion.

Conclusion

In summary, herein is disclosed a new kind of PBD based organogels with excellent stability using a commercial plasticizer as the organic phase. Specifically, the dynamic mechanical properties remain unchanged after placing the PBD based organogels in a high vacuum environment for 72 h. Owing to the melting/crystallization transition and crosslinked molecular network, the newly designed organogels exhibited a promising two-way shape memory property, which can be actuated below 0° C. with giant actuation strain. In particular, the EUC and CUH are 156% and 151% respectively, in the working temperature range of −40 to 60° C., which are higher than those of the reported systems. Besides the high actuation strain, the reversibility of the actuation is calculated to be 97%, demonstrating high actuation stability in practice. The PBD based organogel systems can be applied outdoors as actuators that are triggered by natural temperature change.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

REFERENCES

1. Behl, M. et al., Reversible bidirectional shape-memory polymers, Adv. Mater. 25 (2013) 4466-4469, doi:10.1002/adma.201300880.
2. Behl, M. et al., Temperature-memory polymer actuators, Proc. Natl. Acad. Sci. USA 110 (2013) 12555-12559, doi:10.1073/pnas.1301895110.
3. Cai, S. et al., High strength, recyclable, anti-swelling and shape-memory hydrogels based on crystal microphase crosslinking and their application as flexible sensor, Chem. Eng. J. 430 (2022), 132957, doi:10.1016/j.cej.2021.132957.
4. Cao, Z. et al., Transparent, mechanically robust, and ultrastable ionogels enabled by hydrogen bonding between elastomers and ionic liquids, Mater. Horiz. 7 (2020) 912-918, doi:10.1039/C9MH01699F.
5. Chen, Y. et al., Self-healing hydrogel sensors with multiple shape memory properties for human motion monitoring, New J. Chem. 45 (2021) 314-320, doi:10.1039/D0NJ04923A.
6. Chivers, P. R. A. et al., Shaping and structuring supramolecular gels, Nat. Rev. Mater. 4 (2019) 463-478, doi:10.1038/s41578-019-0111-6.
7. Chung, T. et al., Two-way reversible shape memory in a semicrystalline network, Macromolecules 41 (2008) 184-192, doi:10.1021/ma071517z.
8. Eke, G. et al., Development of a UV crosslinked biodegradable hydrogel containing adipose derived stem cells to promote vascularization for skin wounds and tissue engineering, Biomaterials 129 (2017) 188-198, doi:10.1016/j.biomaterials.2017.03.021.
9. Fan, J. et al., High performance and tunable artificial muscle based on two-way shape memory polymer, RSC Adv. 7 (2017) 1127-1136, doi:10.1039/C6RA25024F.
10. Feng, X. et al, UV curable, flame retardant, and pressure-sensitive adhesives with two-way shape memory effect, Polymer 249 (2022), 124835, doi:10.1016/j.polymer.2022.124835.
11. Feng, X. et al., High-temperature shape memory photopolymer with intrinsic flame retardancy and record-high recovery stress, Appl. Mater. Today 23 (2021), 101056, doi:10.1016/j.apmt.2021.101056.
12. Gu, Y. et al., Polymer networks: from plastics and gels to porous frameworks, Angew. Chem. Int. Ed. 59 (2020) 5022-5049, doi:10.1002/anie.201902900.
13. Hao, C. et al., Triple one-way and two-way shape memory poly(ethylene-co-vinyl acetate)/poly(ε-caprolactone) immiscible blends, J. Appl. Polym. Sci. 139 (2022), 51426, doi:10.1002/app.51426.
14. Hong, S. J. et al., Two-way shape memory behavior of shape memory polyurethanes with a bias load, Smart Mater. Struct. 19 (2010), 035022, doi:10.1088/0964-1726/19/3/035022.
15. Huang, M. et al., Two-way shape memory property and its structural origin of cross-linked poly(ε-caprolactone), RSC Adv. 4 (2014) 55483-55494, doi:10.1039/C4RA09385B.
16. Inverardi, N. et al., Reversible stress-driven and stress-free two-way shape memory effect in a sol-gel crosslinked polycaprolactone, Macromol. Symp. 405 (2022), 2100254, doi:10.1002/masy.202100254.
17. Inverardi, N. et al., Stress-free two-way shape memory effect of poly(ethylene glycol)/Poly(ε-caprolactone) semicrystalline networks, Macromolecules 55 (2022) 8533-8547, doi:10.1021/acs.macromol.2c01064.
18. Laza, J. M. et al., Tailoring new bisphenol a ethoxylated shape memory polyurethanes, Macromol. J. Appl. Polym. Sci. 138 (2021), e49660, doi:10.1002/app.49660.
19. Lendlein, A. et al., Reprogrammable recovery and actuation behaviour of shape-memory polymers, Nat. Rev. Mater. 4 (2019) 116-133, doi:10.1038/s41578-018-0078-8.
20. Lu, H. F. et al., Interpenetrating liquid-crystal polyurethane/polyacrylate elastomer with ultrastrong mechanical property, J. Am. Chem. Soc. 141 (2019) 14364-14369, doi:10.1021/jacs.9b06757.
21. Lu, L. et al., Giant reversible elongation upon cooling and contraction upon heating for a crosslinked cis poly (1,4-butadiene) system at temperatures below zero Celsius, Sci. Rep. 8 (2018), 14233, doi:10.1038/s41598-018-32436-9.
22. Lu, L. et al., One-way multishape-memory effect and tunable two-way shape memory effect of ionomer poly (ethylene-co-methacrylic acid), ACS Appl. Mater. Interfaces 8 (2016) 14812-14823, doi:10.1021/acsami.6b04105.
23. Lu, W. et al., Supramolecular shape memory hydrogels: a new bridge between stimuli-responsive polymers and supramolecular chemistry, Chem. Soc. Rev. 46 (2017) 1284-1294, doi:10.1039/C6CS00754F.
24. Ma, L. et al., Effects of carbon black nanoparticles on two-way reversible shape memory in crosslinked polyethylene, Polymer 56 (2015) 490-497, doi:10.1016/j.polymer.2014.11.036.
25. Merino, S. et al., Nanocomposite hydrogels: 3D polymer-nanoparticle synergies for on-demand drug delivery, ACS Nano 9 (2015) 4686-4697, doi:10.1021/acsnano.5b01433.

26. Murcia, A. P. et al., Two-way shape memory polymers: evolution of stress vs evolution of elongation, Macromolecules 54 (2021) 5838-5847, doi:10.1021/acs.macromol.1c00568.
27. Panja, S. et al., Stimuli responsive dynamic transformations in supramolecular gels, Chem. Soc. Rev. 50 (2021) 5165-5200, doi:10.1039/D0CS01166E.
28. Pfau, M. R. et al., PCL-based shape memory polymer semi-IPNs: the role of miscibility in tuning the degradation rate, Biomacromolecules 21 (2020) 2493-2501, doi:10.1021/acs.biomac.0c00454.
29. Qin, H. et al., Combined one-way and two-way shape memory in a glass-forming nematic network, Macromolecules 42 (2009) 273-280, doi:10.1021/ma8022926.
30. Raquez, J. M. et al., Design of cross-linked semicrystalline poly(ε-caprolactone)-based networks with one-way and two-way shape-memory properties through diels-alder reactions, Chem. Eur J. 17 (2011) 10135-10143, doi:10.1002/chem.201100496.
31. Sano, K. et al., Synthesis of anisotropic hydrogels and their applications, Angew. Chem. Int. Ed. 57 (2018) 2532-2543, doi:10.1002/anie.201708196.
32. Sarrafan, S. et al., A soft syntactic foam actuator with high recovery stress, actuation strain, and energy output, Mater. Today Commun. 31 (2022), 103303, doi:10.1016/j.mtcomm.2022.103303.
33. Thomsen, D. L. et al., Liquid crystal elastomers with mechanical properties of a muscle, Macromolecules 34 (2001) 5868-5875, doi:10.1021/ma001639q.
34. Tippets, C. A. et al., Dynamic optical gratings accessed by reversible shape memory, ACS Appl. Mater. Interfaces 7 (2015) 14288-14293, doi:10.1021/acsami.5b02688.
35. Wang, K. et al., Multiple and two-way reversible shape memory polymers: Design strategies and applications, Prog. Mater. Sci. 105 (2019), 100572, doi:10.1016/j.pmatsci.2019.100572.
36. Wang, Y. et al., Transparent, stimuliresponsive films from cellulose-based organogel nanoparticles, Adv. Funct. Mater. 25 (2015) 1434-1441, doi:10.1002/adfm.201403067.
37. Xia, Y. et al, A review of shape memory polymers and composites: mechanisms, materials, and applications, Adv. Mater. 33 (2021), 2000713, doi:10.1002/adma.202000713.
38. Xie, T. et al., Hidden thermoreversible actuation behavior of nafion and its morphological origin, Macromolecules 47 (2014) 1085-1089, doi:10.1021/ma402203q.
39. Yan, C. et al., A phenomenological constitutive model for semicrystalline two-way shape memory polymers, Int. J. Mech. Sci. 177 (2020), 105552, doi:10.1016/j.ijmecsci.2020.105552.
40. Yang, Q. et al., One-way and two-way shape memory effects of a high-strain cis-1,4-polybutadiene-polyethylene copolymer based dynamic network via self-complementary quadruple hydrogen bonding, Polym. Chem. 10 (2019) 718-726, doi:10.1039/C8PY01614C.
41. Zare, M. et al., Thermally-induced two-way shape memory polymers: mechanisms, structures, and applications, Chem. Eng. J. 374 (2019) 706-720, doi:10.1016/j.cej.2019.05.167.
42. Zeng, L. et al., Recent advances of organogels: from fabrications and functions to applications, Prog. Org. Coating 159 (2021), 106417, doi:10.1016/j.porgcoat.2021.106417.
43. Zhao, Z. et al., Highly stretchable, shape memory organohydrogels using phase-transition microinclusions, Adv. Mater. 29 (2017), 1701695, doi:10.1002/adma.201701695.
44. Zhou, J. et al., Shapeshifting: reversible shape memory in semicrystalline elastomers, Macromolecules 47 (2014) 1768-1776, doi:10.1021/ma4023185.

What is claimed is:

1. A two-way shape memory organogel comprising a crosslinked polymer consisting of cis-poly(1,4-butadiene) (PBD), a photoinitiator, and an organic free phase.

2. The two-way shape memory organogel of claim 1, wherein the polymer is present at from about 10 wt % to about 100 wt % of the organogel.

3. The two-way shape memory organogel of claim 1, wherein the photoinitiator comprises 2-hydroxy-2-methylpropiophenone, phenylbis(2,4,6-trimethylbenzoyl) phosphine oxide, 2,2-dimethoxy-2-phenylacetophenone, 2,2-bimethoxy-2-phenylacetophenone, 1-Hydroxycyclohexyl phenyl ketone, diphenyl(2,4,6-trimethylbenzoyl) phosphine oxide, 2,4-diethyl-9H-thioxanthen-9-one, a triarylsulfonium hexafluorophosphate salt, lithium phenyl-2,4,6-trimethylbenzoylphosphinate, a triarylsulfonium hexafluoroantimonate salt, 2-hydroxy-4'-(2-hydroxyethoxy)-2-methylpropiophenone, ethyl (2,4,6-trimethylbenzoyl) phenylphosphinate, 2-methyl-4'-(methylthio)-2-morpholinopropiophenone, 2-isopropylthioxanthone, benzophenone, 4-chlorobenzophenone, 4-benzoylbiphenyl, 2-benzyl-2-(dimethylamino)-4'-morpholino-butyrophenone, or any combination thereof.

4. The two-way shape memory organogel of claim 1, wherein the photoinitiator is present at about 3 wt % of the organogel.

5. The two-way shape memory organogel of claim 1, wherein the organic free phase comprises a plasticizer.

6. The two-way shape memory organogel of claim 5, wherein the plasticizer comprises bis(2-ethylhexyl) phthalate, dioctyl phthalate, dibutyl phthalate, diisobutyl phthalate, tritolyl phosphate, trioctyl phosphate, butyl oleate, tributyl citrate, epoxidized soybean oil, dibutyl sebacate, dioctyl sebacate, bis(2-ethylhexyl) adipate, dioctyl adipate, tributyl O-acetylcitrate, Tri (ethylene glycol) bis(2-ethylhexanoate), butyl oleate, epoxidized linseed oil, butyl epoxy stearate, or any combination thereof.

7. The two-way shape memory organogel of claim 1, wherein the organic free phase is present at from about 40 wt % to about 80 wt % in the two-way shape memory organogel.

8. The two-way shape memory organogel of claim 1, wherein the two-way shape memory organogel loses less than 5% total weight after 48 h in a high vacuum environment.

9. The two-way shape memory organogel of claim 1, wherein the two-way shape memory organogel loses less than about 5% total weight after 2 h at 100° C.

10. The two-way shape memory organogel of claim 1, wherein the two-way shape memory organogel has a reversible elongation upon cooling (EUC) of from about 50% to about 200%.

11. The two-way shape memory organogel of claim 1, wherein the two-way shape memory organogel has a reversible contraction upon heating (CUH) of from about 50% to about 200%.

12. The two-way shape memory organogel of claim 1, wherein actuation reversibility is greater than 50%.

13. A method for making the two-way shape memory organogel of claim 1, the method comprising:

(a) contacting an uncrosslinked polymer consisting of cis-poly(1,4-butadiene) (PBD) with an organic solvent to produce a swollen polymer;
(b) admixing the swollen polymer with the organic free phase and the photo-initiator;
(c) evaporating the organic solvent to form an uncrosslinked organogel; and
(d) curing the uncrosslinked organogel to form the two-way shape memory organogel.

14. The method of claim 13, wherein curing is accomplished using UV irradiation.

15. The method of claim 13, further comprising 3D printing the uncrosslinked organogel into a three-dimensional shape prior to performing step (d).

16. A device comprising the two-way shape memory organogel of claim 1.

17. The device of claim 16, wherein the device comprises a sensor or an actuator.

18. The device of claim 17, wherein the sensor comprises a strain sensor or a temperature sensor.

19. The device of claim 18, wherein the strain sensor further comprises conductive particles selected from metallic particles, carbon black, multiwalled carbon nanotubes (MWCNTs), graphene flakes, graphite flakes, MXene nanosheets, silver nanowires, or any combination thereof embedded in a surface of the two-way shape memory organogel.

* * * * *